(12) United States Patent
Omachi et al.

(10) Patent No.: US 12,473,393 B2
(45) Date of Patent: Nov. 18, 2025

(54) CURABLE COMPOSITION

(71) Applicant: Sunstar Engineering Inc., Osaka (JP)

(72) Inventors: Takuro Omachi, Osaka (JP); Akimi Ebata, Osaka (JP); Hiroyuki Nagata, Osaka (JP)

(73) Assignee: Sunstar Engineering Inc., Osaka (JP)

( * ) Notice: Subject to any disclaimer, the term of this patent is extended or adjusted under 35 U.S.C. 154(b) by 39 days.

(21) Appl. No.: 18/444,929

(22) Filed: Feb. 19, 2024

(65) Prior Publication Data

US 2025/0011521 A1 Jan. 9, 2025

Related U.S. Application Data

(62) Division of application No. 16/469,806, filed as application No. PCT/JP2016/088801 on Dec. 26, 2016, now abandoned.

(51) Int. Cl.
| | |
|---|---|
| *C08G 18/12* | (2006.01) |
| *C08G 18/48* | (2006.01) |
| *C08G 18/50* | (2006.01) |
| *C08G 18/61* | (2006.01) |
| *C08G 77/14* | (2006.01) |
| *C08K 5/00* | (2006.01) |
| *C08K 5/17* | (2006.01) |

(Continued)

(52) U.S. Cl.
CPC ......... *C08G 18/12* (2013.01); *C08G 18/4833* (2013.01); *C08G 18/5096* (2013.01); *C08G 18/61* (2013.01); *C08G 77/14* (2013.01); *C08K 5/0025* (2013.01); *C08K 5/17* (2013.01); *C08K 5/42* (2013.01); *C08G 2101/00* (2013.01); *C08J 2205/052* (2013.01); *C08J 2375/08* (2013.01); *C08L 2203/14* (2013.01)

(58) Field of Classification Search
CPC . C08G 18/12; C08G 18/4833; C08G 18/5096
See application file for complete search history.

(56) References Cited

U.S. PATENT DOCUMENTS

| | | | |
|---|---|---|---|
| 4,552,946 A | 11/1985 | Scholl et al. | |
| 5,866,668 A * | 2/1999 | Maeda | C08L 75/12 524/789 |
| 6,139,967 A | 10/2000 | Tozuka et al. | |

(Continued)

FOREIGN PATENT DOCUMENTS

| | | | |
|---|---|---|---|
| JP | 3131224 B2 * | 1/2001 | ......... C08G 18/0838 |
| JP | 2002-356533 | 12/2002 | |

(Continued)

OTHER PUBLICATIONS

Partial translation of JP 2002-356533 by Fukami et al (Year: 2002).*

(Continued)

*Primary Examiner* — Christina H.W. Rosebach
(74) *Attorney, Agent, or Firm* — Renner, Otto, Boisselle & Sklar, LLP

(57) ABSTRACT

A curable composition used to produce a polyurethane foam comprises an isocyanate group-containing urethane pre-polymer (I) having an oxyalkylene ether skeleton and no siloxane skeleton, and an isocyanate group-containing urethane pre-polymer (II) having a siloxane skeleton and an oxyalkylene ether skeleton.

15 Claims, 1 Drawing Sheet

(51) Int. Cl.
    *C08K 5/42*      (2006.01)
    *C08G 101/00*      (2006.01)

(56) References Cited

U.S. PATENT DOCUMENTS

| | | |
|---|---|---|
| 7,445,588 B2 | 11/2008 | Hattori et al. |
| 2005/0004306 A1 | 1/2005 | Lubnin et al. |
| 2005/0202946 A1 | 9/2005 | Hattori et al. |
| 2013/0253085 A1 | 9/2013 | Cremer et al. |
| 2018/0264421 A1 | 9/2018 | Nakanishi et al. |

FOREIGN PATENT DOCUMENTS

| | | | |
|---|---|---|---|
| JP | 2002356533 A | * | 12/2002 |
| JP | 2004506076 | | 2/2004 |
| JP | 2005060502 | | 3/2005 |
| JP | 2005254519 | | 9/2005 |
| JP | 2006035617 | | 2/2006 |
| JP | 2013052492 | | 3/2013 |
| JP | 2013545849 | | 12/2013 |
| WO | 2016125900 | | 8/2016 |

OTHER PUBLICATIONS

Machine Translation of JP 2002-356533 by Fukami et al (Year: 2002).*
Hossieny, N.J. et al. Foaming behavior of melt compounded thermoplastic polyurethane in presence of butane. ANTEC 2012 Plastics. pp. 2307-2311 (Year: 2012).*
Mills, N.J. "Polyurethane foams: processing and microstructure" in Polymer Foams Handbook, 2007. pp. 19-37. (Year: 2007).*
Polyurethane foams from "Chapter 9 Polyurethanes" by Janik, H et al in Handbook of Thermoset Plastics (3rd Edition)from Handbook of Thermoset Plastics (3rd Edition) DOI: http://dx.doi.org/10.1016/B978-1-4557-3107-7.00009-9. pp. 284-286 (Year: 2014).*
Machine translation of JP 2006035617 by Okuda et al (Year: 2006).*
Mesamoll by Lanxess (Year: 2015).*
Michael Szycher. Jul. 13, 2012, Structure and Property Relations in Polyurethanes from: Szycher's Handbook of Polyurethanes CRC Press (Year: 2012).*
"polyurethane precursor" by Tanzi, M.C.Wiley Encyclopedia of Composites, Second Edition. Edited by Luigi Nicolais and Assunta Borzacchiello. 2012 (Year: 2012).*
Nicolais, L. and Tanzi, M.C. (2011). Polyurethane Precursors. In Wiley Encyclopedia of Composites, L. Nicolais (Ed.). https://doi.org/10.1002/9781118097298.weoc191 (Year: 2011).
Sonnenschein, M.F. and Koonce, W. (2011). Polyurethanes. In Encyclopedia of Polymer Science and Technology, (Ed.). https://doi.org/10.1002/0471440264.pst295.pub2 (Year: 2011).
Michael Szycher. Jul. 13, 2012, Structure-Property Relations in Polyurethanes from: Szycher's Handbook of Polyurethanes CRC Press. (Year: 2012).
JP 2002-356533 partial human translation (Year: 2002).
Machine Translation of JP 2002356533 by Fukami et al. (Year: 2006).
Derwent abstract of JP 2002356533 by Fukami et al (Year: 2006).
Derwent abstract of WO 9526374 (JP 3131224) by Maeda et al. (Year: 1995).
Mesamoll plastics additives/plasticizer by Lanxess. Accessed at https://add.lanxess.com/fileadmin/product-import/mesamoll_en_rcr.pdf on Jun. 2, 2021 (Year: 2015).
Search Report for corresponding Singaporean Patent Application No. 11201905897V dated Apr. 27, 2020.
Written Opinion for corresponding Singaporean Patent Application No. 11201905897V dated May 12, 2020.
Zhang, Y. et al., Synthesis and Characterization of Novel Organosilicon—Modified Polyurethane. Journal of Applied Polymer Science, Jan. 14, 2012, vol. 125, pp. 1486-1492.
International Preliminary Report on Patentability for corresponding International Application No. PCT/JP2016/088801, ssued Jul. 2, 2019 and English translation.
Official Action for corresponding Japanese Application No. 2018-507039 dated Mar. 20, 2018.
International Search Report for related International Application No. PCT/JP2016/088801 dated Feb. 22, 2017.

* cited by examiner

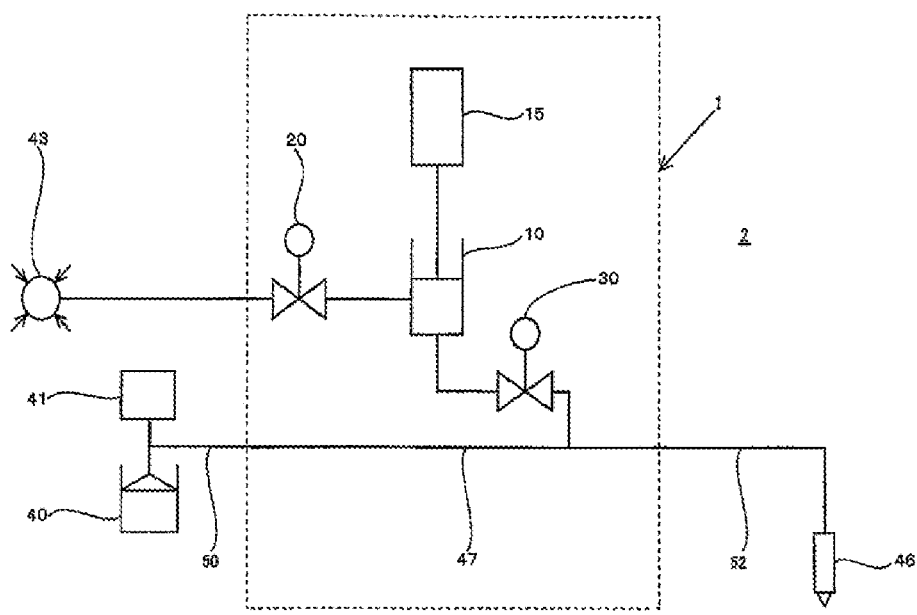

CURABLE COMPOSITION

This application is a Divisional of and claims priority to U.S. application Ser. No. 16/469,806, filed Jun. 14, 2019, which is a US PCT National Phase of PCT/JP2016/088801, filed Dec. 26, 2016, each of which is hereby incorporated herein by reference in its entirety.

TECHNICAL FIELD

The present invention relates to a curable composition that is used to produce a polyurethane foam to be used in car parts and the like, a polyurethane foam that is produced using the curable composition, and a method for producing the polyurethane foam.

BACKGROUND ART

A polyurethane foam is used as a sealing material used in parts for a car, and the like. An open-cell polyurethane foam has recently been proposed that comprises a compound having a siloxane skeleton, with a purpose of improving the water shut-off property (Patent Document 1 and Patent Document 2).

PRIOR ART DOCUMENTS

Patent Documents

Patent Document 1: Japanese Laid-Open Patent Publication No. 2004-506076
Patent Document 2: Japanese Laid-Open Patent Publication No. 2005-60502

SUMMARY OF THE INVENTION

Problem to be Solved by the Invention

In the case where the polyurethane foam described in each of Patent Document 1 and Patent Document 2 is used as a sealing material, however, any satisfactory water shut-off property may not be obtained when, for example, the polyurethane foam is used for a long time. Development is therefore demanded for a polyurethane foam whose sealing property is further improved.

An object of the present invention is to provide a curable composition that is used to produce a polyurethane foam that is excellent in the sealing property, a polyurethane foam that is produced using the curable composition, and a method for producing the polyurethane foam.

Means for Solving Problem

The inventors focused on and actively studied an isocyanate group-containing urethane pre-polymer having a siloxane skeleton and an oxyalkylene ether skeleton, as a urethane pre-polymer comprised in a curable composition to be used to produce a polyurethane foam. As a result, the inventors found that the object was able to be solved by a curable composition that comprises the urethane pre-polymer and an isocyanate group-containing urethane pre-polymer having an oxyalkylene ether skeleton and no siloxane skeleton.

The present invention includes the following preferred aspects.
[1] A curable composition to be used to produce a polyurethane foam, the curable composition comprising an isocyanate group-containing urethane pre-polymer (I) that has an oxyalkylene ether skeleton and no siloxane skeleton, and an isocyanate group-containing urethane pre-polymer (II) that has a siloxane skeleton and an oxyalkylene ether skeleton, wherein the siloxane skeleton is represented by the following formula (1);

[Ch. 1]

and wherein $R^a$ and $R^b$ each independently represent a monovalent substituent group and r represents an integer equal to or larger than 1.
[2] The curable composition according to [1], wherein the urethane pre-polymer (II) has the oxyalkylene ether skeleton having the isocyanate group bonded thereto, and the siloxane skeleton having the oxyalkylene ether skeletons bonded to both sides thereof.
[3] The curable composition according to [1] or [2], wherein the urethane pre-polymer (II) has the siloxane skeleton and the oxyalkylene ether skeleton bonded to each other through an alkylene skeleton, and/or a urethane bond or a urea bond.
[4] The curable composition according to any one of [1] to [3], wherein the content of the siloxane skeleton in the urethane pre-polymer (II) is 0.001 to 5% by mass relative to 100% by mass of the total amount of an overall NCO group-containing compound contained in the curable composition.
[5] The curable composition according to any one of [1] to [4], wherein $R^a$ and $R^b$ in the formula (1) are each independently a methyl group or an ethyl group.
[6] The curable composition according to any one of [1] to [5], wherein the content of the siloxane skeleton in the curable composition is 0.001 to 5% by mass relative to 100% by mass of the curable composition, and wherein $R^a$ and $R^b$ in the formula (1) are each a methyl group.
[7] The curable composition according to any one of [1] to [6], wherein the number of the repeating units of siloxane constituting the siloxane skeleton in the urethane pre-polymer (II) is 1 to 100.
[8] The curable composition according to any one of [1] to [7], wherein at least a portion of the urethane pre-polymer (I) and/or the urethane pre-polymer (II) is chain-elongated.
[9] The curable composition according to any one of [1] to [8], further comprising a latent curing agent.
[10] The curable composition according to [9], wherein the latent curing agent is a fine particles-coated amine whose surface of a solid amine is coated with fine particles.
[11] The curable composition according to [10], wherein the fine particles-coated amine has the surface of the solid amine that has a melting point equal to or higher than 50° C. and a central particle diameter equal to or smaller than 20 μm, coated with the fine particles having the central particle diameter equal to or smaller than 2 μm, and has an amount of heat equal to or smaller than 220 J/g at the second absorption peak measured using a differential scanning calorimeter.
[12] The curable composition according to any one of [1] to [11], further comprising a plasticizer and a filler.

[13] The curable composition according to [12], wherein the plasticizer is an alkyl sulfonic acid phenyl-based ester (Mesamoll).

[14] A polyurethane foam produced using the curable composition according to any one of [1] to [13].

[15] A method for producing the polyurethane foam according to [14], the method comprising the steps of:
(i) mixing a gas into the curable composition according to any one of [1] to [13];
(ii) discharging the curable composition having the gas mixed therein obtained at step (i) from a nozzle; and
(iii) curing the discharged curable composition, wherein steps (i) and (ii) are conducted using a mechanical foaming apparatus.

[16] The method according to [15], wherein, at step (i), a discharging exit is closed that is disposed in the mechanical foaming apparatus such that a pipe path through which the curable composition can flow and a cylinder communicate with each other,
a piston disposed inside the cylinder is moved to leave the discharging exit to thereby form a cylinder space having a predetermined volume in the cylinder,
the cylinder space is filled with a gas at a predetermined pressure,
the piston is moved toward the discharging exit to thereby compress the gas, and
the discharging exit is opened to thereby mix the compressed gas into the curable composition flowing through the pipe path.

Effect of the Invention

The polyurethane foam produced using the curable composition of the present invention has an excellent sealing property. Thus, the polyurethane foam produced using the curable composition of the present invention can be advantageously used as a sealing material.

BRIEF DESCRIPTION OF DRAWING

FIG. 1 is a circuit diagram of a mechanical foaming apparatus that includes an apparatus to mix a gas into a curable composition of the present invention.

MODES FOR CARRYING OUT THE INVENTION

Curable Composition

A curable composition to be used to produce a polyurethane foam of the present invention comprises an isocyanate group-containing urethane pre-polymer (I) having an oxyalkylene ether skeleton and no siloxane skeleton, and an isocyanate group-containing urethane pre-polymer (II) having a siloxane skeleton and an oxyalkylene ether skeleton. The oxyalkylene ether skeleton includes an oxyalkylene ether skeleton whose number of repetitions of an oxyalkylene group is equal to or larger than 1 and a polyoxyalkylene ether skeleton whose number of repetitions of an oxyalkylene group is equal to or larger than 2. The siloxane skeleton includes a siloxane skeleton whose number of repetitions of siloxane is equal to or larger than 1 and a polysiloxane skeleton whose number of repetitions of siloxane is equal to or larger than 2.

Urethane Pre-Polymer (I)

Urethane pre-polymer (I) is an isocyanate group-containing urethane pre-polymer that has the oxyalkylene ether skeleton and no siloxane skeleton. The oxyalkylene ether skeleton represents, for example, a skeleton represented by a formula: —[$R^a$—O-]p- (where $R^a$ represents a straight-chain or a branched-chain alkylene group, and p represents an integer of 1 to 350). Examples of the alkylene group include, for example, $C_{1\ to\ 6}$ alkylene groups such as an ethylene group, a propylene group, a trimethylene group, an n-butylene group (a tetramethylene group), an i-butylene group, ans-butylene group, and a t-butylene group. Among these, preferably, an ethylene group and a propylene group are used from the viewpoint of the physical properties after the curing. "p" is, preferably, 10 to 250 and, more preferably, 20 to 200 from the viewpoint of the physical properties and the viscosity after the curing. The siloxane skeleton not included in the urethane pre-polymer (I) means a siloxane skeleton (C) that is included in the urethane pre-polymer (II).

Typical examples of the urethane pre-polymer (I) include a urethane pre-polymer that is acquired by a reaction between a polyoxyaklylene polyol (A) and a polyisocyanate (B). Due to this reaction, a hydroxyl group of the polyoxyalkylene polyol (A) and an isocyanate group of the polyisocyanate (B) form a urethane bond, and the urethane pre-polymer (I) therefore has a constituent unit (A) originated from polyoxyalkylene polyol and a constituent unit (B) originated from polyisocyanate that are bonded through the urethane bond.

Examples of the polyoxyalkylene polyol (A) include, for example, polyether polyols each formed by addition polymerization of alkylene oxide such as ethylene oxide, propylene oxide, or butylene oxide to a multiple alcohol such as ethylene glycol, propylene glycol, glycerin, trimethylolpropane, pentaerythritol, sorbitol, or sucrose. Among these, from the viewpoint of the physical properties and the viscosity after the curing, preferably, polyether polyol is used that is formed by addition polymerization of at least one of propylene oxide and ethylene oxide to ethylene glycol, glycerin, or propylene glycol. The number of mols of alkylene oxide to be added (the number of polyoxyalkylene) is, preferably, 10 to 250 and, more preferably, 20 to 200 from the viewpoint of the physical properties and the viscosity after the curing. Each of these polyoxyalkylene polyols (A) can be used alone, or two or more thereof can be used in combination.

The average number of the functional groups of the polyoxyalkylene polyol (A) is 1.5 to 4 and, more preferably, 1.8 to 3.5 from the viewpoint of the bridging property. The number average molecular weight (Mn) of the polyoxyalkylene polyol (A) is, preferably, 500 to 30,000, more preferably, 1,000 to 20,000 and, yet more preferably, 1,500 to 15,000. When the molecular weight is in the above ranges, this is advantageous in respect of the physical properties and the viscosity after the curing. The number average molecular weight (Mn) is a polystyrene-converted value that is measured using a gel permeation chromatography (GPC).

Examples of a typical commercially available product of the polyoxyalkylene polyol (A) include, for example, Excenol 5030 produced by Asahi Glass Co., Ltd., Excenol 2020 produced by Asahi Glass Co., Ltd., Preminol SS3010 produced by Asahi Glass Co., Ltd., and Preminol S3015 produced by Asahi Glass Co., Ltd.

Examples of the polyisocyanate (B) include, for example, aromatic, aliphatic, and alicyclic polyisocyanates. The examples include, for example, $C_{2\ to\ 8}$ methylenediisocyanates such as tolylenediisocyanate (TDI; a 2,4-isomer, a 2.6-isomer, and a mixture of these), diphenylmethanediisocyanate (MDI), 3,3'-dimethyl-4,4'-biphenylenediisocyanate, 1.4-phenylenediisocyanate, xylylenediisocyanate, tetramethylxylylenediisocyanate, naphtylenediisocyanate, dicyclohexylmethane-4.4'-diisocyanate, crude TDI, crude MDI, polymethylene polyphenylisocyanate, isophoronediisocyanate (IPDI), trimethylhexamethylenediisocyanate (TMDI), hexamethylenediisocyanae, and pentamethylenediisocyanate, hydrogenated xylylenediisocyanate, tetrahydroxyxylylenediisocyanate, norbornenediisocyanate (NBDI), and isocyanurated products, carbodiimidized products, and biuretized products of the above. Each of these polyisocyanates (B) can be used alone, or two or more thereof can be used in combination. Among these, preferably, TDI, MDI, IPDI, TMDI, and the like are used from the viewpoint of the economic efficiency and the physical properties.

The polyoxyalkylene polyol (A) and the polyisocyanate (B) are reacted with each other such that the mol ratio (NCO/OH) of isocyanate groups (NCO-groups) of the polyisocyanate (B) to the hydroxyl groups (OH-groups) of the polyoxyalkylene polyol (A) is, preferably, 1.2 to 3 and, more preferably, 1.2 to 2.5.

The NCO content of the urethane pre-polymer (I) is, preferably, 0.5 to 10% by mass, more preferably, 1 to 7% by mass, and, yet more preferably, 1.5 to 5% by mass. When the NCO content is in the above ranges, the sealing property of the obtained urethane pre-polymer can be improved. The NCO content can be measured using the method described in Examples.

The urethane pre-polymer (I) has a number average molecular weight (Mn) of, preferably, 500 to 30,000, more preferably, 1,000 to 20,000, and, yet more preferably, 2,000 to 15,000. When the molecular weight is in the above ranges, this is advantageous for the physical properties after the curing. The number average molecular weight (Mn) is a polystyrene-converted value that is measured using a gel permeation chromatography (GPC).

One or more type(s) of urethane pre-polymer (I) only has/have to be contained in the curable composition. When two or more types thereof are contained in the curable composition, the types of the constituent unit (A) and/or (B) comprised in the different types of urethane pre-polymer (I) may differ from each other between the different types of urethane pre-polymer (I), and the content of (A) and the content of (B) may differ from each other.

Specific examples of the advantageous urethane pre-polymer (I) include, for example, a urethane pre-polymer whose polyoxyalkylene polyol (A) constituting the constituent unit (A) is at least one selected from polyoxypropylene polyol and polyoxyethylene/propylene polyol and whose polyisocyanate (B) constituting the constituent unit (B) is MDI, TDI, TMDI, or IPDI.

Urethane Pre-Polymer (II)

The urethane pre-polymer (II) is an isocyanate group-containing urethane pre-polymer that has a siloxane skeleton (referred to as "siloxane skeleton (C)") and an oxyalkylene ether skeleton (referred to as "oxyalkylene ether skeleton (D)"). Preferably, the urethane pre-polymer (II) includes the oxyalkylene ether skeleton (D) that has an isocyanate group bonded thereto and the siloxane skeleton (C) that has the oxyalkylene ether skeletons (D) bonded to both sides thereof. Because the curable composition of the present invention contains the urethane pre-polymer (II), the cell diameters of the obtained polyurethane foam are uniformed and the foaming property becomes excellent, and the sealing property can therefore be also improved. For example, properties such as an excellent water shut-off property can be exhibited. The water shut-off property in the present invention means a property of suppressing any water leakage in, for example, a test to measure the sealing property descried in Examples.

In the urethane pre-polymer (II), the oxyalkylene ether skeleton (D) may be located in the main chain or a side chain and, preferably, may be located in the main chain. Especially, preferably, two oxyalkylene ether skeleton parts are included in the main chain and, more preferably, are located on both sides of the siloxane skeleton (C). When this urethane pre-polymer (II) is contained in the curable composition, the cell diameters of the acquired polyurethane foam are uniformed and the foaming property becomes excellent to be able to further improve the sealing property.

The oxyalkylene ether skeleton (D) represents a skeleton represented by, for example, a formula: —[$R^b$—O-] q- (where $R^b$ represents a straight-chain or a branched-chain alkylene group and q represents an integer of 1 to 55). Examples of the alkylene group include, for example, $C_{1\ to\ 6}$ alkylene groups such as an ethylene group, a propylene group, trimethylene group, an n-butylene group (tetramethylene group), an i-butylene group, an s-butylene group, and a t-butylene group. Among these, preferably, an ethylene group and a propylene group are used from the viewpoint of the physical properties, the viscosity, and the foaming property. "q" is, preferably, an integer of 1 to 35, more preferably, an integer of 2 to 25, and, yet more preferably, an integer of 5 to 10 from the viewpoint of the physical properties, the viscosity, and the foaming property.

The siloxane skeleton (C) presents a skeleton that includes repeating units that are connected to each other by siloxane bonds. The siloxane skeleton herein means a skeleton represented by the following formula (1)

[Ch. 2]

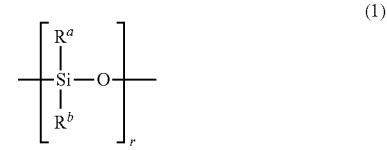

(where $R^a$ and $R^b$ each independently represent a monovalent substituent group and r represents an integer equal to or larger than 1).

Examples of the monovalent substituent group of each of $R^a$ and $R^b$ of the formula (1) include, for example, halogen atoms such as a fluorine atom, a chlorine atom, a bromine atom, and an iodine atom; alkoxy groups such as a methoxy group, an ethoxy group, a propoxy group, an isopropoxy group, an n-butoxy group, an s-butoxy group, and a t-butoxy group; cycloalkoxy groups such as a cyclohexyloxy group; aryloxy groups such as phenoxy group; aralkyloxy groups such as a benzyloxy group; alkylthio groups such as a methylthio group and an ethylthio group; cycloalkylthio groups such as a cyclohexylthio group; arylthio groups such as a thiophenoxy group; aralkylthio groups such as a benzylthio group; acyl groups such as an acetyl group; a carboxyl group; alkoxycarbonyl groups such as a methoxycarbonyl group; a nitro group; a cyano group; an amino group or a substituted amino group; and monovalent hydrocarbon groups such as $C_{1\ to\ 6}$ alkyl groups such as a methyl group, an ethyl group, a propyl group, an isopropyl group, an n-butyl group, an s-butyl group, and a t-butyl group, $C_{6\ to\ 12}$ aryl groups such as a benzene ring, and $C_{5\ to\ 8}$ cycloalkyl groups such as a cyclopentyl group and a cyclohexyl group. Among these monovalent substituent groups, preferably, the monovalent hydrocarbon group is used. Especially, from the viewpoint of the foaming property, preferably, $R^a$ and $R^b$ in the formula (1) are each independently a methyl group or an ethyl group, or are each a methyl group. From the viewpoint of the foaming property, r is, preferably, an integer of 1 to 100, more preferably, an integer of 1 to 55, yet more preferably, an integer of 3 to 55, and, especially preferably, an integer of 3 to 30 and, yet especially preferably, is an integer of 5 to 30.

An isocyanate group may bond to either the oxyalkylene ether skeleton (D) or the siloxane skeleton (C), or may bond to both of these skeletons. The oxyalkylene ether skeleton and the siloxane skeleton may be bonded to each other through an alkylene group, or a urethane bond or a urea bond.

In the urethane pre-polymer (II), the arrangement of the siloxane skeleton (C) and the oxyalkylene ether skeleton (D) and the bonding position of the isocyanate group are not especially limited while, from the viewpoint that the sealing property of the obtained polyurethane foam is further improved, preferably, a urethane pre-polymer is used that has the oxyalkylene ether skeleton having an isocyanate group bonded thereto, and the siloxane skeleton having the oxyalkylene ether skeletons bonded to both sides thereof and, especially preferably, a urethane pre-polymer is used that has the oxyalkylene ether skeleton having an isocyanate group bonded thereto, and the siloxane skeleton having the oxyalkylene ether skeletons bonded to both sides thereof each through an alkylene group.

Specific examples of the especially advantageous urethane pre-polymer (II) include a compound represented by the following formula (2),

[Ch. 3]

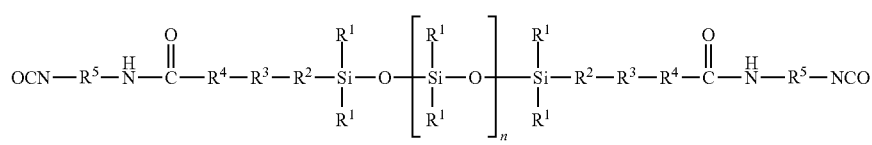

(2)

[where $R^1$s are each independently a monovalent hydrocarbon group, $R^2$s are each independently a straight-chain or a branched-chain alkylene group having 1 to 6 carbon atoms, $R^3$s are each independently an oxyalkylene group represented by a formula: —[$R^6$—O-]m- (where $R^6$ represents a straight-chain or a branched-chain alkylene group having 1 to 6 carbon atom(s) and m represents an integer of 1 to 55), $R^4$ represents —O— or —NH—, $R^5$ represents a divalent aliphatic hydrocarbon group, a divalent alicyclic hydrocarbon group, or a divalent aromatic hydrocarbon group, and n represents an integer of 1 to 100]. When the compound represented by the formula (2) is used as the urethane pre-polymer (II), the cell diameters of the obtained polyurethane foam are uniformed, the foaming property becomes excellent, and the sealing property can further be improved.

For $R^1$ of the formula (2), examples of the monovalent hydrocarbon group include, for example, groups such as a methyl group, an ethyl group, a propyl group, an isopropyl group, an n-butyl group, an s-butyl group, and a t-butyl group; $C_{6\ to\ 12}$ aryl groups such as a benzene ring; and $C_{5\ to\ 8}$ cycloalkyl groups such as a cyclopentyl group and a cyclohexyl group. Among these monovalent hydrocarbon groups, preferably, a methyl group and an ethyl group are used from the viewpoint of the foaming property. $R^1$s may be different from each other or may be same as each other.

For $R^2$ of the formula (2), examples of the straight-chain or the branched-chain alkylene group having 1 to 6 carbon atoms include, for example, a methylene group, an ethylene group, a propylene group, a trimethylene group, an n-butylene group (a tetra methylene group), an i-butylene group, an s-butylene group, and a t-butylene group. Among these, preferably, an ethylene group, a propylene group, and the like are used. $R^2$s may be different from each other or may be same as each other.

For the formula: —[$R^6$—O-]m- of $R^3$ of the formula (2), examples of the straight-chain or the branched-chain alkylene group having 1 to 6 carbon atoms in $R^6$ include, for example, the alkylene groups exemplified for the above $R^2$ and, among these, preferably, an ethylene group, a propylene group, and the like are used from the viewpoint of the foaming property. "m" is, preferably, 2 to 35 and is, more preferably, 5 to 10 from the viewpoint of the foaming property. $R^3$s may be different from each other or may be same as each other.

$R^4$ in the formula (2) is —O— or —NH— and, more preferably, —O— is used.

For $R^5$ of the formula (2), examples of the divalent aliphatic hydrocarbon group include, for example, straight-chain or branched-chain $C_{2\ to\ 12}$ alkylene groups such as an ethylene group, a propylene group, a trimethylene group, an n-butylene group (tetra methylene group), an i-butylene group, an s-butylene group, a t-butylene group, a pentamethylene group, a hexamethylene group, a heptamethylene group, an octamethylene group, and trimethylhexamethylene group. Among these, preferably, a trimethylhexamethylene group is used from the viewpoint of the safety. $R^5$s may be different from each other or may be same as each other.

For $R^5$ of the formula (2), examples of the divalent cyclic hydrocarbon group include, for example, $C_{3\ to\ 8}$ cycloalkanediyl groups such as a cyclohexane-1,3-diyl group, a cyclohexane-1.4-diyl group, a cycloheptane-1,3-diyl group, and a cycloheptane-1.4-diyl group; $C_{3\ to\ 8}$ cycloalkanedimethylene groups such as a cyclohexane-1.3-dimethylene group, and a cyclohexane-1,4-dimethylene group; an isophoronediyl group; di$C_{3\ to\ 8}$ cycloalkylmethanediyl groups such as a dicyclohexylmethane-4,4'-diyl group, and a norbomenediyl group. Among these, from the viewpoint of the economic efficiency, preferably, a cyclohexane-1,3-diyl group, a cyclohexane-1.3-dimethylene group, a dicyclohexylmethane-4,4'-diyl group, and an isophoronediyl group are used and, especially preferably, an isophoronediyl group is used.

For $R^5$ of the formula (2), examples of the divalent aromatic hydrocarbon group include, for example, benzenediyl groups such as a benzene-1,4-diyl group and a benzene-1,3-diyl group; diphenylmethanediyl groups such as a diphenylmethane-4,4'-diyl group; phenylene groups such as an m-phenylene group and a p-phenylene group; methylphenylene groups such as a toluene-2,4-diyl group and a toluene-2,6-diyl group; naphthylene groups such as a 1,5-naphthylene group and a 2,6-naphthylene group; benzenedimethylene groups such as a benzene-1,3-dimethylene group and a benzene-1,4-dimethylene group; bisphenylene groups such as a 4,4'-bisphenylene group; and dimethylbisphenylene groups such as a 3,3'-dimethyl-4,4'-bisphenylene group. Among these, from the viewpoint of the economic efficiency, preferably, a diphenylmethane-4,4'-diyl group, a toluene-2,4-diyl group, and a toluene-2,6-diyl group are used. $R^5$s may be different from each other or may be same as each other.

In the formula (2), n is an integer of 1 to 100, preferably, an integer of 1 to 55, more preferably, an integer of 3 to 55, yet more preferably, an integer of 3 to 30, and, especially preferably, an integer of 5 to 30.

The compounds shown in Table 1 below may be exemplified as specific examples of the compound represented by the formula (2). In Table 1, Me represents a methyl group, Mel represents a methylene group, Eel represents an ethylene group, Prl represents a propylene group, MD represents a diphenylmethane-4,4'-diil group, TD represents a mixture of toluene-2,4-diil group/toluene-2,6-diil group, IPD represents an isophoronediil group, and TMD represents a trimethylhexamethylene group.

TABLE 1

| Compound | $R^1$ | $R^2$ | $R^4$ | $R^5$ | $R^6$ | n | m |
|---|---|---|---|---|---|---|---|
| 1 | Me | Prl | —O— | MD | Ee1 | 3~30 | 1~35 |
| 2 | Me | Prl | —O— | TD | Ee1 | 3~30 | 1~35 |
| 3 | Me | Prl | —O— | IPD | Ee1 | 3~30 | 1~35 |
| 4 | Me | Prl | —O— | TMD | Ee1 | 3~30 | 1~35 |
| 5 | Me | Prl | —O— | MD | Pr1 | 3~30 | 1~35 |
| 6 | Me | Prl | —O— | TD | Pr1 | 3~30 | 1~35 |
| 7 | Me | Prl | —O— | IPD | Pr1 | 3~30 | 1~35 |
| 8 | Me | Prl | —O— | TMD | Pr1 | 3~30 | 1~35 |
| 9 | Me | Prl | —O— | MD | Bu1 | 3~30 | 1~35 |
| 10 | Me | Prl | —O— | TD | Bu1 | 3~30 | 1~35 |
| 11 | Me | Prl | —O— | IPD | Bu1 | 3~30 | 1~35 |
| 12 | Me | Prl | —O— | TMD | Bu1 | 3~30 | 1~35 |
| 13 | Me | Ee1 | —O— | MD | Ee1 | 3~30 | 1~35 |
| 14 | Me | Ee1 | —O— | TD | Ee1 | 3~30 | 1~35 |
| 15 | Me | Ee1 | —O— | IPD | Ee1 | 3~30 | 1~35 |
| 16 | Me | Ee1 | —O— | TMD | Ee1 | 3~30 | 1~35 |
| 17 | Me | Ee1 | —O— | MD | Pr1 | 3~30 | 1~35 |
| 18 | Me | Ee1 | —O— | TD | Pr1 | 3~30 | 1~35 |
| 19 | Me | Ee1 | —O— | IPD | Pr1 | 3~30 | 1~35 |
| 20 | Me | Ee1 | —O— | TMD | Pr1 | 3~30 | 1~35 |
| 21 | Me | Ee1 | —O— | MD | Bu1 | 3~30 | 1~35 |
| 22 | Me | Ee1 | —O— | TD | Bu1 | 3~30 | 1~35 |
| 23 | Me | Ee1 | —O— | IPD | Bu1 | 3~30 | 1~35 |
| 24 | Me | Ee1 | —O— | TMD | Bu1 | 3~30 | 1~35 |
| 25 | Me | Prl | —NH— | MD | Ee1 | 3~30 | 1~35 |
| 26 | Me | Prl | —NH— | TD | Ee1 | 3~30 | 1~35 |
| 27 | Me | Prl | —NH— | IPD | Ee1 | 3~30 | 1~35 |
| 28 | Me | Prl | —NH— | TMD | Ee1 | 3~30 | 1~35 |
| 29 | Me | Prl | —NH— | MD | Pr1 | 3~30 | 1~35 |
| 30 | Me | Prl | —NH— | TD | Pr1 | 3~30 | 1~35 |
| 31 | Me | Prl | —NH— | IPD | Pr1 | 3~30 | 1~35 |
| 32 | Me | Prl | —NH— | TMD | Pr1 | 3~30 | 1~35 |
| 33 | Me | Prl | —NH— | MD | Bu1 | 3~30 | 1~35 |
| 34 | Me | Prl | —NH— | TD | Bu1 | 3~30 | 1~35 |
| 35 | Me | Prl | —NH— | IPD | Bu1 | 3~30 | 1~35 |
| 36 | Me | Prl | —NH— | TMD | Bu1 | 3~30 | 1~35 |
| 37 | Me | Ee1 | —NH— | MD | Ee1 | 3~30 | 1~35 |
| 38 | Me | Ee1 | —NH— | TD | Ee1 | 3~30 | 1~35 |
| 39 | Me | Ee1 | —NH— | IPD | Ee1 | 3~30 | 1~35 |
| 40 | Me | Ee1 | —NH— | TMD | Ee1 | 3~30 | 1~35 |
| 41 | Me | Ee1 | —NH— | MD | Pr1 | 3~30 | 1~35 |
| 42 | Me | Ee1 | —NH— | TD | Pr1 | 3~30 | 1~35 |
| 43 | Me | Ee1 | —NH— | IPD | Pr1 | 3~30 | 1~35 |

TABLE 1-continued

| Compound | $R^1$ | $R^2$ | $R^4$ | $R^5$ | $R^6$ | n | m |
|---|---|---|---|---|---|---|---|
| 44 | Me | Ee1 | —NH— | TMD | Pr1 | 3~30 | 1~35 |
| 45 | Me | Ee1 | —NH— | MD | Bu1 | 3~30 | 1~35 |
| 46 | Me | Ee1 | —NH— | TD | Bu1 | 3~30 | 1~35 |
| 47 | Me | Ee1 | —NH— | IPD | Bu1 | 3~30 | 1~35 |
| 48 | Me | Ee1 | —NH— | TMD | Bu1 | 3~30 | 1~35 |

The content of NCO of the urethane pre-polymer (II) is, preferably, 0.5 to 10% by mass, more preferably, 1 to 7% by mass, and, yet more preferably, 1.5 to 5% by mass. When the content is in the above ranges, the sealing property of the obtained urethane pre-polymer can be improved. The content of NCO can be measured using the method described in Examples.

The urethane pre-polymer (II) has a number average molecular weight (Mn) of, preferably, 800 to 6,000, more preferably, 1,000 to 5,000, and, yet more preferably, 2,000 to 4,000. When the molecular weight is in the above ranges, this is advantageous for the foaming property. The number average molecular weight (Mn) is a polystyrene-converted value that is measured using a gel permeation chromatography (GPC).

The curable composition only has to contain one or more type(s) of urethane pre-polymer (II), and may contain two or more types thereof. When the curable composition contains the two or more types of urethane pre-polymer, the type and the content of at least one of the siloxane skeleton (C), the oxyalkylene ether skeleton (D), and the isocyanate group may be different between the different types of urethane pre-polymer (II).

The urethane pre-polymer (II) is obtained by reacting a hydroxyl group or an amino group-containing compound (E) having the siloxane skeleton (C) and the oxyalkylene ether skeleton (D), with the polyisocyanate (B). Due to this reaction, a urethane bond or a urea bond is formed by a hydroxyl group or an amino group of the compound having the siloxane skeleton and the oxyalkylene ether skeleton, and an isocyanate group of the polyisocyanate (B), and the urethane polymer (II) is thereby obtained.

In a preferred aspect, the urethane pre-polymer (II) which has the oxyalkylene ether skeleton having an isocyanate group bonded thereto, and the siloxane skeleton having the oxyalkylene ether skeletons bonded to both sides thereof is obtained by reacting an oxyalkylene ether skeleton having a hydroxyl group or an amino group bonded thereto, the compound (E) which has the siloxane skeleton having the oxyalkylene ether skeletons bonded to both sides thereof, and the polyisocyanate (B) with each other.

In a more preferred aspect, the compound represented by the formula (2) is obtained by reacting the compound (E) represented by the following formula (3)

[Ch. 4]

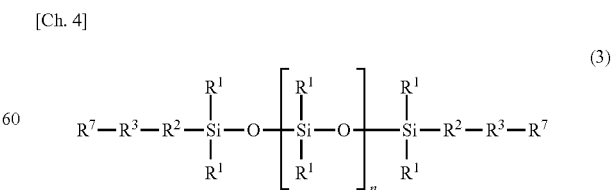

(3)

[where $R^7$ is a hydroxyl group or an amino group, $R^1$ to $R^3$ and n are same as those of the formula (2)], and the polyisocyanate (B) with each other.

Specific examples of the compound represented by the formula (3) include compounds that correspond to the compounds represented by the formula (2) shown in Table 1. SF8427 produced by Dow Corning Toray Co., Ltd., and the like can be exemplified as commercially available products of the compound represented by the formula (3).

For the hydroxyl group or the amino group-containing compound (E) having the siloxane skeleton and the oxyalkylene ether skeleton, and the polyisocyanate (B), the reaction thereof is conducted such that the mol ratio (NCO/OH or $NH_2$) of the isocyanate group (—NCO) of the polyisocianate (B) to the hydroxyl group (—OH group) or the amino group (—$NH_2$ group) of the compound (E) is, preferably, 1.0 to 3 and, more preferably, 1.2 to 2.5.

In the curable composition of the present invention, the content of the urethane pre-polymer (I) is, preferably, 1 to 99% by mass, more preferably, 5 to 80% by mass, yet more preferably, 10 to 70% by mass, especially preferably, 30 to 60% by mass, and yet especially preferably, 35 to 50% by mass relative to the total mass of the curable composition. When the content of the urethane pre-polymer (I) is in the above ranges, the cell diameters of the obtained polyurethane foam can be uniformed and the sealing property can further be improved.

In the curable composition of the present invention, the content of the siloxane skeleton in the urethane pre-polymer (II) is, preferably, 0.001 to 5% by mass, more preferably, 0.005 to 3% by mass, yet more preferably, 0.01 to 1% by mass, and, especially preferably, 0.05 to 0.5% by mass relative to 100% by mass of the total amount of the overall NCO group-containing compound in the curable composition. When the content of the siloxane skeleton in the urethane pre-polymer (II) is in the above ranges, the cell diameters of the obtained polyurethane foam can be uniformed, the foaming property can be excellent, and the sealing property can be further improved. The siloxane skeleton means the skeleton represented by the formula (1), that is contained in the urethane pre-polymer (II). The total amount of the overall NCO group-containing compound contained in the curable composition means the summed mass of all the compounds each containing NCO-groups in the curable composition, including the urethane pre-polymers (I) and (II). For example, when the NCO group-containing urethane pre-polymers except the urethane pre-polymers (I) and (II), and an isocyanate additive described later are contained, the total amount means the summed mass of all of these compounds.

In a preferred aspect of the present invention, the content of a dimethylsiloxane skeleton in the curable composition is, preferably, 0.001 to 5% by mass, more preferably, 0.005 to 3% by mass, more preferably, 0.01 to 1% by mass, and especially preferably, 0.05 to 0.5% by mass relative to 100% by mass of the curable composition, and $R^a$ and $R^b$ in the formula (1) are each a methyl group (referred to as "dimethylsiloxane skeleton"). When the content of the dimethylsiloxane skeleton is in the above ranges, the cell diameters of the obtained polyurethane foam can be uniformed, the foaming property can be excellent, and the sealing property can further be improved.

The urethane pre-polymer (I) and the urethane pre-polymer (II) may be synthesized separately from each other or may concurrently be synthesized. When the urethane pre-polymers (I) and (II) are concurrently synthesized, products each dimerized or higher are also formed that each include the structure units of the urethane pre-polymers (I) and (II). The products each including the structure units of the urethane pre-polymers (I) and (II) are included in the urethane pre-polymer (II). A polymer including the structure units of the urethane pre-polymers (I) and (II) is produced by intentionally synthesizing concurrently a portion of the urethane pre-polymer (I) and the urethane pre-polymer (II). Setting the ratio of NCO to OH or $NH_2$ groups to be 2 or smaller can facilitate the dimerization, can maintain the foam structure of the urethane foam preventing any non-uniformity of the cell diameters, and can make the effect for exhibiting an excellent sealing property outstanding. A relatively high expansion ratio can also be maintained because any foam breakage can be prevented by setting the cell diameters to be uniform.

Chain-Elongated Urethane Pre-Polymer

In the curable composition of the present invention, at least a portion of the urethane pre-polymer (I) and/or the urethane pre-polymer (II) may be chain-elongated by a chain elongating agent. The urethane pre-polymer (I) and/or the urethane pre-polymer (II) may partially or wholly be chain-elongated.

Preferably, a chain elongating agent including two or more functional groups, preferably, two or more hydroxyl groups or amino groups is used as the chain elongating agent. Specific examples of the chain elongating agent include, for example, ethylene glycol, diethylene glycol, polyethylene glycols (preferably, a polyethylene glycol having a molecular weight equal to or smaller than 500), propylene glycol, polypropylene glycols (preferably, a polypropylene glycol having a molecular weight equal to or smaller than 500), butanediol, dimethylolcyclohexane, methyliminodiethanol, dimethylol propionic acid, and polyoxyaklylenediamins such as ethylenediamine, hexamethylenediamine, polyoxyethylenediamines (preferably, a polyoxyethylenediamine having a molecular weight equal to or smaller than 500), and polyoxypropylenediamines (preferably, a polyoxypropylenediamine having a molecular weight equal to or smaller than 500). Among these, from the viewpoint of the foaming property and the physical properties, preferably, polyoxyalkylenediamines such as polyoxyethylenediamines each having a molecular weight equal to or smaller than 500 and polyoxypropylenediamines each having a molecular weight equal to or smaller than 500 are used.

A urethane pre-polymer (a) (may be referred to as "chain-elongated urethane pre-polymer") formed by chain-elongating the urethane pre-polymer (I) is obtained by reacting the urethane pre-polymer (I) with the chain elongating agent having two or more functional groups. Due to this reaction, an isocyanate group of the urethane pre-polymer (I) and the functional group of the chain elongating agent, preferably, a hydroxyl group or an amino group are bonded to each other (preferably, bonded by a urethane bond or a urea bond) to form the chain-elongated urethane pre-polymer (a). The urethane pre-polymer (a) therefore has the constituent units originated from the urethane pre-polymer (a) and the constituent units originated from the chain elongating agent having two or more functional groups. The urethane pre-polymer (a) may also be produced by reacting the polyoxyalkylene polyol (A), the polyisocyanate (B), and the chain elongating agent with each other.

The urethane pre-polymer (b) formed by chain-elongating the urethane pre-polymer (II) is also obtained by the same reaction as that of the urethane pre-polymer (I). The urethane pre-polymer (b) therefore has the constituent units originated from the urethane pre-polymer (II) and the constituent units originated from the chain elongating agent that has two or more functional groups. The urethane pre-polymer (b) may also be produced by reacting the hydroxyl group or amino group-containing compound (E) having the siloxane skeleton (C) and the oxyalkylene ether skeleton (D), the polyisocyanate (B), and the chain elongating agent with each other.

As to the urethane pre-polymer (I) and the urethane pre-polymer (II), either urethane pre-polymer can also be chain-elongated with the other urethane pre-polymer by using the chain elongating agent. In the urethane pre-polymer (c) that is chain-elongated using this method, an isocyanate group of the urethane pre-polymer (I) and an isocyanate group of the urethane pre-polymer (II) are bonded to the functional groups of the chain elongating agent, preferably, hydroxyl groups or amino groups (preferably, bonded by urethane bonds or urea bonds). The urethane pre-polymer (c) therefore has the constituent units originated from the urethane pre-polymer (I), the constituent units originated from the urethane pre-polymer (II), and the constituent units originated from the chain elongating agent. As above, use of the chain elongating agent to the product of the two urethane pre-polymers enables production of a polymer that includes the constituent units of the two urethane pre-polymers. The urethane pre-polymer (c) may also be produced by reacting the polyoxyalkylene polyol (A), the compound (E), the polyisocyanate (B), and the chain elongating agent with each other. The chain-elongated urethane pre-polymer (c) including the constituent units of the two urethane pre-polymers (I) and (II) can also be produced by using the chain elongating agent to the urethane pre-polymer (II) that includes the constituent units of the urethane pre-polymer (I).

When at least a portion of each of the urethane pre-polymer (I) and the urethane pre-polymer (II) is chain-elongated, the curable composition may contain the chain-elongated urethane pre-polymers (a) and (b), and/or the chain-elongated urethane pre-polymer (c).

In the present invention, in the case where the curable composition contains the urethane pre-polymers, especially, the chain-elongated urethane pre-polymer (a) and the urethane pre-polymer (c) obtained by applying the approach of the chain elongation or the method of synthesizing at the ratio equal to or smaller than 2, to the structure whose one molecule includes the structure units of siloxane and the structure units of oxyalkylene that are included in the urethane pre-polymer (II), the foam structure preventing any non-uniformity of the cell diameters can be maintained and an excellent sealing property can be exhibited even when the expansion ratio of the obtained polyurethane foam is improved.

The rate of the chain elongating agent used for the chain elongation can properly be selected corresponding to the aimed molecular weight of the urethane pre-polymer after the chain elongation. For example, the chain elongating agent is used such that the rate of the functional groups of the chain elongating agent is 0.01 to 0.9 mol, preferably, 0.1 to 0.7 mol, more preferably, 0.2 to 0.6 mol, and, especially preferably, 0.3 to 0.55 mol relative to 1 mol of NCO groups of the urethane pre-polymer before the chain elongation. When the rate is in the above ranges, the foam structure preventing any non-uniformity of the cell diameters can be maintained, an excellent sealing property can be exhibited, any breakage of the foam can be prevented due to setting the cell diameters to be uniform, and a relatively high expansion ratio can therefore be maintained.

The urethane pre-polymers contained in the curable composition of the present invention may each be produced separately from each other while the urethane pre-polymers may collectively be produced. In a method for collectively producing the urethane pre-polymers, such components may be reacted with each other using a commonly used method (for example, mixing), as the polyoxyalkylene polyol (A), the hydroxyl group or amino group-containing compound (E) having the siloxane skeleton (C) and the oxyalkyl ether skeleton (D) and/or the hydroxyl group or amino group-containing compound (F) having the siloxane skeleton (C) and no oxyalkyl ether skeleton (D), the polyisocyanate (B), and optionally the chain elongating agent. When the urethane pre-polymers are collectively produced, the reaction is conducted such that the mol ratio of isocyanate groups (NCO) of the polyisocyanate (B) to the total mol amount of hydroxyl groups (OH groups) of the polyoxyalkylene polyol (A), and hydroxyl groups (OH groups) or amino groups ($NH_2$) of the compound (E) and/or the compound (F) (NCO/the total mol amount of OH groups and $NH_2$) is, preferably, 1.2 to 3 and, more preferably, 1.2 to 2.5.

Block polyisocyanate formed by blocking isocyanate groups of the polyisocyanate (B) using a blocking agent can also be used as the polyisocyanate (B). Examples of the blocking agent include, for example, lactams such as 2-pyrolidone and ε-caprolactam; oximes of ketone or aldehyde such as acetoxime, methylethylketoxime, cyclohexanoneoxime, and acetoaldoxime; alcohols such as methanol, ethanol, propanol, butanol, and isobutanol; phenols such as phenol, cresol, xylenol, p-nitrophenol, nonylphenol, t-butylphenol, styrenated phenol, and alkylphenol; and amine-based blocking agents such as dibutylamine, diphenylamine, aniline, and N-methylaniline.

The curable composition of the present invention may include a urethane pre-polymer other than the urethane pre-polymers (I) and (II), such as, for example, a urethane pre-polymer that includes at least one type of skeleton selected from a butadiene skeleton, a polycarbonate skeleton, a ricinus skeleton, a polyester skeleton, an acrylic skeleton, and the like.

Latent Curing Agent

The curable composition of the present invention may further comprise a latent curing agent. Examples of the latent curing agent include, for example, an amine-based latent curing agent and the like. For example, an arbitrary solid amine belonging to arbitrary aromatic series or arbitrary aliphatic series, and having the melting point equal to or higher than 50° C. can be used as the amine-based latent curing agent. Examples of this include aromatic amines such as 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolylenediamine, 2,4-tolylenediamine, 2,5-tolylenediamine, 2,6-tolylenediamine, and 3,4-tolylenediamine; aliphatic amines such as 1,12-dodecanediamine, 1,10-decanediamine, 1,8-octanediamine, 1,14-tetradecanediamine, and 1,16-hexadecanediamine; dihydrazide compounds such as dihydrazide adipate, dihydrazide sebacate, dihydrazide isophthalate, 1,3-bis(hydrazinocarboethyl)-5-isopropylhydantoin, eicosanedioic acid dihydrazide, dihydrazide hydroquinone diglycolate, resorcinol dihydrazide diglycolate, 4,4'-ethylidenebisphenol dihydrazide diglycolate; and dicyandiamido. Each of these can be used alone, or two or more thereof can be used in combination.

A polyamine-based modified compound can be used as the latent curing agent. Examples of the polyamine-based modified compound include, for example, the reaction products each of an aliphatic polyamine (i) (such as, for example, methylaminopropylamine, diethylaminopropylamine, dipropylaminopropylamine, dibutylaminopropylamine, dimethylaminoethylamine, diethylaminoethylamine, dipropylaminoethylamine, dibutylaminoethylamine, trimethylhexamethylenediamine, and diaminopropane), a ring-structured amine or an aromatic polyamine each having at least one NH₂ or one NH group (ii) (such as, for example, polyamines and monoamines such as methaxylylenediamine, 1,3-bis(aminomethyl)cyclohexane, isophoronediamine, menthanediamine, diaminocyclohexane, phenylenediamine, toluylenediamine, xylylenediamine, diaminodiphenylmethane, diaminodiphenylsulfone, piperazine, N-aminoethylpiperazine, benzylamine, and cyclohexylamine), and a diisocyanate compound (iii) (such as, for example, isophoronediisocyanate, methaxylylenediisocyanate, 1,3-bis(isocyanatemethyl)cyclohexane, 2,4-toluylenediisocyanate, 2,6-toluylenediisocyanate, 1,5-naphthylenediisocyanate, 1,4-phenylenediisocyanate, diphenylmethane-4,4'-diisocyanate, 2,2'-dimethyldiphenylmethane-4,4'-diisocyanate, hexamethylenediisocyanate, and trimethylhexamethylenediisocyanate) [where the ratios of the reaction components are selected to be (i) 1 mol, (ii) 0.02 to 3 mol, and NH₂ and/or NH of (i) and (ii)/NCO of (iii)=1/1 to 1.2, and the components only have to be reacted in a solvent such as an aromatic hydrocarbon, an alcohol, or a ketone at a temperature of the room temperature to 160° C.], and the reaction product each of the aliphatic polyamine (i), the amine (ii), the isocyanate compound (iii), and an epoxide compound (iv) (such as a glycidyl ether obtained by reacting epichlorohydrin with a polyhydric phenol such as bisphenol A, bisphenol F, bisphenol S, hexahydrobisphenol A, catechol, resorcin, trihydroxybiphenyl, benzophenone, hydroquinone, or tetramethylbisphenol A; a polyglycidyl ether obtained by reacting epichlorohydrin with an aliphatic multiple alcohol such as glycerin, neopentyl glycol, ethylene glycol, or polyethylene glycol; a glycidyl ether ester obtained by reacting epichlorohydrin with a hydroxycarboxylic acid such as p-oxybenzoic acid or oxynaphthoic acid; a polyglycidyl ester derived from a polycarboxylic acid such as phthalic acid, isophthalic acid, tetrahydrophthalic acid, endomethylenetetrahydrophthalic acid, trimellitic acid, or a polymerized aliphatic acid; a glycidyl aminoglycidyl ether derived from aminophenol or aminoalkylphenol; a glycidyl aminoglycidyl ester derived from aminobenzoic acid; a glycidylamine derived from aniline, toluidine, tribromoaniline, xylylenediamine, or 4,4'-diaminodiphenylmethane; or a monoepoxide such as epoxidized polyolefin, glycidylhydantoin, glycidylalkylhydantoin, triglycidyl cyanurate, a butylglycidyl ether, a phenylglycidyl ether, an alkylphenylglycidyl ether, a bnzoic acid glycidyl ester, or styrene oxide) [where the ratios of the components are selected to be (i) 1 mol, (ii) 0.5 to 5 mol, NH₂ and/or NH of (i) and (ii)/epoxy groups of (iv)=1/0.3 to 0.9, and NH₂ and/or NH of (i) and (ii)/NCO of (iii)=1/0.15 to 1.35, and a portion or the entirety of (ii), and (iv) only have to first be addition-reacted in, when necessary, the above solvent at 60 to 120° C. and (i), the rest of (ii), and (iii) are added to the above to only have to be reacted in the above solvent at a temperature from the room temperature to 160° C.].

When the fine particles-coated amine whose surface of the solid amine is coated with the fine particles is used as the latent curing agent, the curable composition can be cured at a relatively low temperature and in a short time.

An inorganic fine particles and an organic fine particles can be used as the fine particles. Examples of the inorganic fine particles include titanium oxide, calcium carbonate, clay, silica, zirconia, carbon, alumina, talc, and mica (isinglass). Examples of the organic fine particles include polyvinyl chloride, a polyacrylic resin. polystyrene, polyethylene, and a urea resin. Each of these can be used alone, or two or more thereof can be used in combination.

Preferably, the central particle diameter of the solid amine is equal to or smaller than 20 µm. The lower limit value of the central particle diameter is, preferably, equal to or larger than 1 µm, more preferably, equal to or larger than 1.5 µm, yet more preferably, equal to or larger than 2 µm, and, especially preferably, equal to or larger than 3 µm. The upper limit value thereof is, preferably, equal to or smaller than 15 µm, more preferably, equal to or smaller than 12 µm, yet more preferably, equal to or smaller than 10 µm, especially preferably, equal to or smaller than 8 µm, and, yet especially preferably, equal to or smaller than 6 µm. The range of the central particle diameter may be a combination of any one of the upper limited values and any one of the lower limit values and, for example, may be 1 µm to 15 µm, preferably, 1 µm to 12 µm, more preferably, 1.5 to 10 µm, yet more preferably, 2 µm to 8 µm, and especially preferably, 3 µm to 6 µm. When the central particle diameter exceeds 20 µm, any imperfectly cured substance tends to be obtained during the curing by heating. Precipitation may also occur in the composition and the discharge amount during application may also not be stable. In the present invention, the central particle diameter refers to the particle diameter whose passing portion cumulative distribution is 50%, that is acquired using a dry unit of a laser diffraction/scattering particle size distribution measuring apparatus.

The central particle diameter of the fine particles is, preferably, equal to or smaller than 2 µm, more preferably, equal to or smaller than 1 µm, yet more preferably, equal to or smaller than 0.5 µm, especially preferably, equal to or smaller than 0.1 µm, and, yet especially preferably, equal to or smaller than 0.05 µm. When the central particle diameter of the fine particles is equal to or smaller than 2 µm, the fine particles can easily be caused to adhere to the surface of the solid amine.

The mass ratio of the solid amine to the fine particles (the solid amine/fine particles) is, preferably, 1/0.001 to 1/0.5 and, more preferably, 1/0.01 to 1/0.5. When the mass ratio of the solid amine to the fine particles is in the above ranges, the storage stability can efficiently be obtained.

Among the fine particles-coated amines, preferably, the fine particles-coated amine is used that has the surface of the solid amine having the melting point of equal to or higher than 50° C. and the central particle diameter of equal to or smaller than 20 µm, coated with the fine particles having the central particle diameter equal to or smaller than 2 µm, and whose heat amount at the second absorption peak measured by a differential scanning calorimeter is equal to or smaller than 220 J/g. The inclusion of this fine particles-coated amine in the curable composition enables stable acquisition of excellent curing property and excellent physical properties, above all, excellent breaking strength even when the curable composition is cured at a relatively low curing temperature such as, for example, 100° C.

The second absorption peak heat amount refers to the absorbed heat amount at the heat absorption peak measured following the first heat absorption peak (the melting point) measured by a differential scanning calorimeter when the fine particles-coated amine is heated. The second absorption peak heat amount is assumed to be attributable to an amino group that is carbonated by the reaction represented by a formula below:

$$RNH_2 + CO_2 + H_2O \rightarrow RNH_3^+ CO_3H^-$$

and the fine particles-coated amine contains more active amino groups ($NH_2$) that are not carbonated as the second absorption peak heat amount is smaller to be highly activated as a curing agent. The second absorption peak heat amount of the fine particles-coated amine of the present invention is equal to or smaller than 220 J/g, preferably, equal to or smaller than 200 J/g, and, more preferably, equal to or smaller than 150 J/g. When the second absorption peak neat amount is equal to or smaller than 220 J/g, the fine particles-coated amine is fully activated even at a relatively low curing temperature such as, for example, 100° C. and high activity can be obtained as a curing agent in the curable composition. The second absorption peak heat amount can be measured by the method described in Examples. The fine particles-coated amine can be produced according to the method described in Japanese Laid-Open Patent Publication No. 2000-117090.

The content of the fine particles-coated amine in the curable composition of the present invention is, preferably, 0 to 10% by mass, more preferably, 0.5 to 7% by mass, yet more preferably, 1 to 5% by mass, and, yet especially preferably, 2 to 4% by mass relative to the total mass of the curable composition. When the content of the fine particles-coated amine is in the above ranges, the curing property and the breaking strength after the curing of the curable composition can be improved.

Additives

The curable composition of the present invention may comprise an isocyanate additive with the purpose of adhesiveness, adjusting the physical properties, and adjusting the curing property. For example, the polyisocyanate (B) and the like, monoisocyanates, and multimerized compounds of the polyisocyanate (B) can be exemplified as the isocyanate additive. Examples of monoisocyanate include, for example, p-toluenesulfonylisocyanate, n-octadecylisocyanate, and the like. Examples of the multimerized compound include, for example, an isocyanurated compound, a biuretized compound, and a compound that are polymerized by the component described as the chain elongating agent, and the like.

The content of the isocyanate additive in the curable composition is, preferably, 0 to 5% by mass, more preferably, 0.1 to 3% by mass, and, yet more preferably, 0.2 to 1% by mass relative to the total mass of the curable composition.

The curable composition of the present invention may comprise optionally a filler, a plasticizer, a curing catalyst, and other additives.

Examples of the filler include heavy calcium carbonate, surface-untreated calcium carbonate, surface-treated calcium carbonate such as, for example, aliphatic acid-treated calcium carbonate and the like, fumed silica, hydrophobic silica, precipitating silica, carbon black, talc, mica (isinglass), clay, glass beads, balloons such as a micro balloon, a shirasu balloon, a glass balloon, a silica balloon, a plastic balloon, and an organic powder-coated plastic balloon, plastic particles, inorganic fibers such as a glass fiber and a metal fiber, organic fibers such as a polyethylene fiber, and a polypropylene fiber, needle crystal fillers such as aluminum borate, silicon carbide, silicon nitride, potassium titanate, graphite, needle crystal calcium carbonate, magnesium borate, titanium diboride, chrysotile, and wollastonite, aluminum flakes, aluminum powder, and iron powder. Each of these can be used alone, or two or more thereof can be used in combination.

The curable composition of the present invention includes the filler whose amount is, preferably, equal to or larger than 10% by mass, more preferably, equal to or larger than 15% by mass, and, yet more preferably, equal to or larger than 20% by mass relative to the total mass of the curable composition. The curable composition of the present invention includes the filler whose amount is, preferably, equal to or smaller than 70% by mass, more preferably, equal to or smaller than 60% by mass, yet more preferably, equal to or smaller than 50% by mass, and, especially preferably, equal to or smaller than 40% by mass relative thereto. When the content of the filler is equal to or larger than 10% by mass, this is advantageous in respects of the physical properties and the workability. When the content of the filler is equal to or smaller than 70% by mass, this is advantageous in respects of the physical properties and the foaming property.

Examples of the plasticizer (a viscosity reducing agent or a viscosity adjusting agent) include, for example, phthalic acid esters such as di(2-ethylhexyl) phthalate, butylbenzil phthalate, dinonyl phthalate, diisononyl phthalate (DINP), diisodecyl phthalate, diundecyl phthalate, diheptyl phthalate, and butylphthalylbutyl glycolate; aliphatic dibasic acid esters such as dioctyl adipate, diisononyl adipate, didecyl adipate, and dioctyl sebacate; polyglycol benzoic acid esters such as polyoxyethyleneglycol dibenzoate and polyoxypropyleneglycol dibenzoate; trimellitic acid esters; pyromellitic acid esters; phosphoric acid esters such as tributyl phosphate, and tricregyl phosphate; an alkyl sulfonic acid phenyl-based ester (Mesamoll); hydrocarbons such as alkylbenzene, alkyl-substituted diphenyl, alkyl-substituted terphenyl, partially-hydrogenated alkylterphenyl, aromatic process oils, pine oil, paraffin-based ones, naphthene-based ones, polybutene-based ones, and the like; and epoxidated hexahydro phthalic acid diesters. Each of the plasticizers can be used alone, or two or more thereof can be used in combination, and the plasticizer can be used within a range not obstructing the firing point, the viscosity, the foaming property, the curing property, and the like.

The content of the plasticizer in the curable composition may be 0 to 50% by mass, preferably, 5 to 45% by mass, and more preferably, 10 to 40% by mass relative to the total mass of the curable composition. When the content of the plasticizer is in the above ranges, this is advantageous in respects of the physical properties after the curing that are excellent and facilitation of the work to apply the curable composition.

Examples of the curing catalyst include organic tin compounds such as, for example, tin octylate, tin naphthenate, tin stearate, dibutyltin dioctoate, dibutyltin dilaurate, dioctyltin dibasatate, dibutyltin bistriethoxy silicate, dibutyltin dioleylmaleate, dibutyltin diacetate, 1,1,3,3-tetrabutyl-1,3-dilaulyloxycarbonyl-distanoxane, dibutyltin oxybisethoxy silicate, dibutyltin oxide, a reaction product of dibutyltin oxide and a phthalic acid ester, a reaction product of dibutyltin oxide and maleic acid diester, and dibutyltin diacetylacetate. Examples of other organic metal compounds include carboxylic acid (for example, octylic acid) salts of bismuth, barium, calcium, indium, titanium, zirconium, calcium, zinc, iron, cobalt, and lead such as, for example, bismuth octylate and calcium octylate. Each of these can be used alone, or two or more thereof can be used in combination.

The curable composition of the present invention includes the curing catalyst whose amount is, preferably, equal to or larger than 0.01% by mass and, more preferably, equal to or larger than 0.1% by mass relative to the total mass of the urethane pre-polymer contained in the curable composition. The curable composition of the present invention contains the curing catalyst whose amount is, preferably, equal to or smaller than 10% by mass and, more preferably, equal to or smaller than 5% by mass relative thereto. The amount of the used curing catalyst can properly be adjusted corresponding to the curing rate.

A coloring agent (for example, colcothar, titanium oxide, carbon black, another coloring pigment or a dye, or the like), an organic solvent (for example, acetone, methylethylketone, ligroin, ethyl acetate, tetrahydrofuran, n-hexane, or heptane), an adhering agent (for example, a silane coupling agent such as aminosilane, mercaptosilane, or epoxysilane, or an epoxy compound), a UV absorbing agent and a light stabilizing agent (for example, a benzotriazole or a hindered amine), an oxidation inhibitor (for example, hindered phenols), a thixotropy agent (for example, colloidal silica, organic bentonite, aliphatic acid amide, or hydrogenated castor oils), a solvent (for example, an alicyclic hydrocarbon or an aromatic hydrocarbon), silicone oil, and the like can be used as other additives each in a range of the proper amount when necessary. Examples of the silicone oil include, for example, diorgano polysiloxanes such as dimethylsilicone oil and methylphenylsilicone oil; organohydrogen polysiloxanes such as methylhydrogen silicone oil; and silicone oils each having various types of functional group introduced in a branch chain and/or at a terminal thereof.

The curable composition of the present invention may include a commonly used foaming agent such as, for example, water, aliphatic hydrocarbons such as propane, butane, pentane, and hexane, aromatic hydrocarbons such as toluene, halogenated hydrocarbons such as trichloride fluoride methan, ethers such as dimethyl ether, ketones such as acetone and methylethylketone, ADCA-based, OBSH-based, DPT-based, and inorganic pyrosysis-type foaming agents, and heat expansion-type balloons each including a gas such as isobutane or isopentane while, as described later, in the present invention, a gas such as, for example, nitrogen or air is mixed into the curable composition using a mechanical foaming apparatus and a curing process is thereafter conducted to thereby obtain a desired polyurethane foam. Any foaming agent is therefore not always necessary.

The curable composition of the present invention can be produced by mixing or kneading the components using a commonly used method. The curable composition of the present invention may be used as a two-component system or a three-component system while the curable composition is usually used as a one-component system.

The curable composition of the present invention may be moisture-curable, heat-curable, ultraviolet rays (UV)-curable, or the like. The curable composition may be cured at a temperature of 0° C. to 50° C. while, preferably, the curable composition is cured by being heated to a temperature exceeding 50° C. from the viewpoint that the curing rate is increased. The time period to cure the curable composition can properly be selected corresponding to the film thickness and the like of the polyurethane foam and may be, for example, about 3 minutes to about 24 hours. Especially, when the curable composition includes the fine particles-coated amine, the curable composition can be cured at a relatively low temperature such as, for example, 50 to 150° C., preferably, 60 to 120° C., and, more preferably, 70 to 100° C. for a short time period such as, for example, 1 minute to 30 minutes and, preferably, about 5 minutes to about 20 minutes.

[Polyurethane Foam]

The present invention encompasses a polyurethane foam that is produced using the curable composition.

The polyurethane foam of the present invention is produced from the curable composition having high moldability and the shape thereof is therefore not especially limited. For example, the polyurethane foam may have a shape such as, for example, a string-like shape, a bar-like shape, a sheet-like shape, a film-like shape, a block-like shape, a plate-like shape, a network-like shape, or a pipe-like shape. The surface of the polyurethane foam may be smooth or may have recesses and protrusions.

The polyurethane foam of the present invention has at least closed-cell foams and, preferably, the rate of the closed-cell foams in the polyurethane foam is larger than the rate of the open-cell foams therein and an excellent sealing property can thereby be exhibited. Properties such as an excellent water shut-off property can be presented even when the polyurethane foam is put under a high-temperature environment or is used for a long time.

The polyurethane foam has micro-sized cells (or foams). The mode cell diameter of the polyurethane foam is, preferably, 1 to 500 µm, more preferably, 10 to 400 µm, and, yet more preferably, 30 to 250 µm. When the average cell diameter is equal to or larger than the lower limit value, the pressing force applied to the adjacent cells can be increased and the sealing property of the polyurethane foam can be improved. When the average cell diameter is equal to or smaller than the upper limit value, any communication with the adjacent cells can be suppressed and absorption of a large amount of water by the cells can be suppressed when the cells are broken. When the average cell diameter is in the above ranges, the sealing property of the polyurethane foam can therefore be improved and the water shut-off property of the polyurethane foam can further be improved. The cell diameter can be calculated using, for example, observation by a microscope.

The polyurethane foam of the present invention is excellent in the sealing property and can present an excellent water shut-off property even under the conditions of, for example, a high temperature (for example, 80° C.) and a long time period (for example, 30 days). Preferably, the polyurethane foam of the present invention has uniform closed-cell foams and is also excellent in the inner mold release property and, even when the compression rate is low (for example, even with a compression rate of 30%), can therefore maintain an excellent sealing property and can present properties such as a high water shut-off property.

The polyurethane foam of the present invention is applicable to architectural materials for civil engineering and constructions, packages, electric and electronic devices, cars, household articles, sports articles, daily-living articles, and the like to which such functions are required as higher heat insulation, less weight, being more buffering, being more cushioning, higher sound insulation, higher vibration suppression, higher impact absorption, protection, a decorating or a decorated skin, water shutting-off, and airtightness. In the present invention, as above, the foaming material is applicable to, for example, a sealing material, an adhesive, a coating material, a gasket material, a packing, a buffering material, a heat insulating material, a foaming molded article, and the like.

The polyurethane foam of the present invention can be produced by mixing a gas into the curable composition and thereafter curing the curable composition.

In a preferred aspect, a method for producing the polyurethane foam includes the steps of
 (i) mixing a gas into the curable composition,
 (ii) discharging the curable composition having the gas mixed therein obtained at step (i) from a nozzle; and
 (iii) curing the discharged curable composition, wherein steps (i) and (ii) are conducted using a mechanical foaming apparatus.

At step (i), examples of the gas mixed into the curable composition include, for example, air (the air at the atmospheric pressure, low pressure air, or compressed air), a carbon dioxide gas, nitrogen, oxygen, argon, krypton, and the like and, especially preferably, air, nitrogen, and the like are used.

Preferably, (1) a method according to which the curable composition is pressure-fed through a pipe path by, for example, a pump and a compressed gas is mixed from a piston pump or the like into the pressure-fed curable composition, is used as the method of mixing the gas from the viewpoint that the adjustment of the amount of the gas to be mixed is easy and the expansion ratio is easily controlled. Such method may also be employed as that according to which a compressed gas is injected into a pipe that includes the curable composition to mix the compressed gas into the curable composition. Preferably, the mixed gas is dispersed in the curable composition and the gas foams are miniaturized. The dispersion and the miniaturization may be conducted in a method using a mixer such as, for example, a static mixer or a dynamic mixer. When the latter gas mixing method is employed, the method may be a method according to which the curable composition having the gas mixed therein is naturally dispersed or miniaturized while the curable composition flows through the pipe path.

Preferably, (2) a method according to which a cylinder is filled with the curable composition and a gas to weigh and mix with each other the curable composition and the gas, is used as another method for mixing the gas from the viewpoint that the control of the gas flow is facilitated, any dispersion of the mixing ratios of the curable composition and the gas is reduced, and the foaming state is stabilized to conduct uniform foaming. Preferably, the curable composition having the gas mixed therein is pressured by a pump or the like, is dispersed in the pressured state, and the foams of the gas are miniaturized. The dispersion and the miniaturization may be conducted using the above mixer or the like while, for example, a method may be employed according to which the dispersion or the miniaturization is conducted while the curable composition flows through a dispersing pipe path (for example, a dispersing pipe path having a spiral shape or the like).

At step (ii), the nozzle is a nozzle to apply the curable composition having the gas mixed therein and can arbitrarily discharge the curable composition. The nozzle can be used in an arbitrary method and, for example, may be a hand-held nozzle or a nozzle attached at the tip of a manipulator. At step (ii), the curable composition is discharged from the nozzle and is applied to the aimed object. Because the curable composition of the present invention is excellent in the moldability, the curable composition can be applied in a desired shape (for example, string-like shape application). Various types of molding are therefore enabled such as injection molding, foaming molding, and cast molding. When the curable composition is discharged from the nozzle, the foams of the gas mixed therein are expanded due to the influence caused by the fact that the curable composition under a high pressure in the mechanical foaming apparatus is put under the atmospheric pressure, and the mixed gas foams at the expansion ratio corresponding to the amount of the gas. In the present invention, because a gas such as, for example, air, nitrogen, or the like is used, no poisonous gas is generated and excellent workability is acquired.

At step (iii), the discharged curable composition is left untouched or undergoes a proper curing process such as, for example, a thermal curing process, a UV curing process, or a moisture curing process, and is thereby cured to be able to obtain the polyurethane foam. The discharge temperature of the curable composition can be adjusted in the mechanical foaming apparatus and the discharge temperature can be adjusted to a proper temperature such as, for example, 10 to 150° C.

In a preferred aspect of the method (1) for producing of the present invention, at step (i), a discharging exit is closed that is disposed in the mechanical foaming apparatus such that a pipe path through which the curable composition can flow and a cylinder communicate with each other, a piston disposed inside the cylinder is moved to leave the discharging exit to thereby form a cylinder space having a predetermined volume in the cylinder, the cylinder space is filled with a gas having a predetermined pressure, the piston is moved toward the discharging exit to thereby compress the gas, and the discharging exit is opened to thereby mix the compressed gas into the curable composition flowing through the pipe path.

The mechanical foaming apparatus conducting steps (i) and (ii) is not especially limited only when the mechanical foaming apparatus can conduct steps (i) and (ii) and examples thereof include, for example, a mechanical foaming apparatus depicted in FIG. 1.

FIG. 1 is a circuit diagram of an example of a mechanical foaming apparatus. Based on FIG. 1, the mechanical foaming apparatus and a gas mixing method at step (i) in the preferred aspect (the method (1) for producing) of the present invention will be described below.

The mechanical foaming apparatus of FIG. 1 includes a gas mixing apparatus 1, a tank 40 to store the curable composition, a pressure-feeding pump 41 that pressure-feeds the curable composition stored in the tank 40, a pipe path 50 that guides the curable composition pressure-fed from the pressure-feeding pump 41 to a pipe path 47, a gas compressor 43 that supplies the gas to a piston pump 10 through an intake valve 20, a pipe path 52 through which the curable composition having the gas mixed therein sent from the pipe path 47 flows, and a nozzle 46 that is attached to the tip of a gun to discharge the curable composition having the gas mixed therein sent from the pipe path 52.

The gas mixing apparatus 1 at least has the piston pump 10 to discharge the gas into the pipe path space (formed as a path for the curable composition formed by the pipe path 47) through which the curable composition flows, and a discharge valve 30 that controls the gas supply from the piston pump 10 to the pipe path 47. Preferably, the gas mixing apparatus 1 further has a driving part 15 that drives the piston pump 10, and the intake valve 20 that controls the gas supply to the piston pump 10, and FIG. 1 depicts an embodiment that also has these configurations.

The pipe paths 50, 47, and 52 are configured to each be a pipe path separated from each other and may be pipe paths that are connected in this order to each other using welding, flanges, or the like such that the curable composition flows through these pipe paths.

For example, a known pail can or a known drum can may be used as the tank 40 while the tank 40 is not limited to these.

The pressure-feeding pump 41 is not especially limited only when the pressure-feeding pump 41 can pressure-feed the curable composition. For example, an air motor-type double action pump, a rotary pump such as a gear pump or a screw pump that generates no pulse beat during the pressure-feeding, and the like may also be employed as a piston pump or a plunger pump for a pail can or a drum can as the pressure-feeding pump 41. The curable composition may be able to be pressure-fed at a constant flow by incorporating a constant flow pump in the pressure-feeding pump 41.

In a preferred aspect of the method (2) for producing of the present invention, at step (i), the intake amount of the curable composition and the supply amount of the gas into the cylinder are varied by varying the supply pressure of the gas and the volume of the cylinder and the mixing ratios of the curable composition and the gas is thereby controlled.

In an embodiment, the mechanical foaming apparatus in the method (2) for producing comprises a curable composition supplying apparatus, a compressed gas supplying apparatus, a mixing cylinder for the curable composition and the gas, a curable composition pressure-feeding cylinder, a discharging apparatus, an overall control apparatus that controls all of these components, and the like. The curable composition supplying apparatus conveys the curable composition at a high pressure to supply the curable composition to the mixing cylinder. The compressed gas supplying apparatus supplies a low pressure gas at a predetermined flow and a predetermined pressure to the mixing cylinder. The gas-mixed curable composition in the mixing cylinder passes through the pipes at a high pressure and the gas is thereby dispersed and miniaturized in the curable composition. At this time, a static mixer or a dynamic mixer may be used. The expansion ratio of the curable composition is controlled by controlling the pressure of the gas supplied to the cylinder and the volume of the cylinder.

EXAMPLES

The present invention will be described below in more detail with reference to Examples and Comparative Examples while the present invention is not limited to these examples. Not otherwise especially described, a part and % are based on the mass.

Expansion Ratio

For the polyurethane foam, the expansion ratio was calculated from the volume ratios of the state before the foaming and the state after the foaming. Each of the volumes was acquired using an underwater substitution method.

Measurement of Sealing Property

A bead having a height of 4 mm and a width of 8 mm was applied to be in a U-shape and the bead was sandwiched between two acrylic plates each having a size of 100×150× 10 mm. The bead was fixed to be compressed by 50%. Putting the bead with its open portion of its U-shape upward, water was poured from the upper portion for the water depth to be 100 mm. The water level variation and water leakage after 24 hours were observed to evaluate as follows.
  O . . . No variation of the water level (no water leakage)
  X . . . Water level varied (the water leaked).

Cell Diameter

The bead was cut and the vicinity of the central portion of the cross-section was observed using a microscope to evaluate as follows.
  O . . . Mode diameter was smaller than 150 µm.
  X . . . Mode diameter was equal to or larger than 150 µm.

Measurement of Uniformity of Cells

The bead was cut and the vicinity of the central portion of the cross-section was observed using a microscope to evaluate as follows.
  O . . . 5 or less foams each of a size equal to or larger than 250 µm found by observation in a range of 4 mm$^2$
  Δ . . . Less than 10 foams each of a size equal to or larger than 250 µm found by observation in a range of 4 mm$^2$
  X . . . 10 or more foams each of a size equal to or larger than 250 µm found by observation in a range of 4 mm$^2$ NCO Content The NCO content was measured according to JISK0113 using a potentiometric titration method.

Number Average Molecular Weight

The number average molecular weight (Mn) was calculated as a polystyrene-converted value using a gel permeation chromatography (GPC) using THF as the solvent.

Central Particle Diameter

For the measurement of the particle diameter and the particle size distribution, the measurement was conducted using a laser diffraction/scattering particle size distribution measuring apparatus LA-950V2 manufactured by Horiba, Ltd., in a dry method. The particle diameter whose acquired passing portion cumulative distribution was 50% was determined to be the central particle diameter.

Second Absorption Peak

The second absorption peak heat amount was measured using a differential scanning calorimeter (DSC). The DSC was used that was Q2000 manufactured by TA Instrument Japan Co., Ltd. The temperature was increased from the room temperature to 200° C. at a rate of 5° C./min as the temperature program, and the measurement of the second absorption peak was conducted during the temperature increase.

Production Examples 1 to 9

The raw materials shown in Table 2 and 0.001 wt % of a tin-based catalyst (U-100 produced by Nitto Kasei Co., Ltd) were mixed and stirred with each other for 3 to 6 hours at a temperature of 80° C. using a planetary mixer to react the various types of polyol with isocyanate to thereby obtain pre-polymers 1 to 9. For the pre-polymer 6, however, a pre-polymer of a hydroxyl group-containing compound (E2) having a siloxane skeleton was synthesized and a chain elongating agent was thereafter added to be mixed and stirred with the pre-polymer for 1 hour at 70° C. to obtain a chain-elongated pre-polymer. The blending amount of the chain elongating agent was adjusted such that the content of the siloxane skeleton in the pre-polymer 6 was 8.5%. For the pre-polymer 7, the components excluding the polyoxyalkylene polyols (A2) and (A4) were mixed and stirred with each other using the above method and the above (A2), the above (A4), and 0.001 wt % of a tin-based catalyst were added to be mixed and stirred with the above components for 3 hours at 80° C. In Table 2, NCO/(OH+NH$_2$) ratio represents a mol ratio of NCO groups to OH groups and NH$_2$ groups present in the pre-polymer, and the values in the raw material columns each represent parts by mass.

TABLE 2

| | Production Example | | | | | | | | |
|---|---|---|---|---|---|---|---|---|---|
| | 1 | 2 | 3 | 4 | 5 | 6 | 7 | 8 | 9 |
| Polyoxyalkylene polyol (A1) | 95 | 95 | — | — | — | — | — | — | — |
| Polyoxyalkylene polyol (A2) | — | — | — | — | 33 | — | — | — | — |
| Polyoxyalkylene polyol (A3) | — | — | — | 100 | — | — | — | — | — |
| Mixture of Polyoxyalkylene polyols (A2) and (A4) | — | 5 | — | — | — | — | — | — | 67 |
| Hydroxyl group-containing compound (E1) having a siloxane skeleton and an oxyalkylene ether skeleton | — | — | 100 | — | 67 | — | — | — | — |
| Hydroxyl group-containing compound (F1) having a siloxane skeleton | — | — | — | — | — | — | — | 100 | 33 |
| Mixture of the polyoxyalkylene polyols (A2) and (A4), and the hydroxyl group-containing compound (E2) having a siloxane skeleton and an oxyalkylene ether skeleton | 5 | — | — | — | — | — | 100 | — | — |
| Isocyanate 1 | 12.5 | 12.4 | 22.6 | — | — | — | — | 23.2 | 16.6 |
| Isocyanate 2 | — | — | — | 7.0 | 17.5 | 17.5 | 17.5 | — | — |
| Hydroxyl group-containing compound (E2) having a siloxane skeleton, a chain elongating agent | — | — | — | — | — | 100 | — | — | — |
| Total | 112 | 112 | 123 | 107 | 118 | 118 | 118 | 123 | 117 |
| NCO/(OH + NH$_2$) ratio | 2.0 | 2.0 | 2.0 | 2.0 | 1.5 | 1.5 | 1.5 | 2.0 | 1.5 |
| NCO content (%) | 2.22 | 2.20 | 3.69 | 1.23 | 1.88 | 1.88 | 1.88 | 3.77 | 1.89 |

Polyoxyalkylene Polyol (A1)

Excenol 5030 produced by Asahi Glass Co., Ltd. (whose number average molecular weight Mn=5,000, whose average number of functional groups f=3, and whose OH number=33)

Polyoxyalkylene Polyol (A2)

Excenol 2020 produced by Asahi Glass Co., Ltd. (whose number average molecular weight Mn=2,000, whose average number of functional groups f=2, and whose OH number=56)

Polyoxyalkylene Polyol (A3)

PreminolS 3011 produced by Asahi Glass Co., Ltd. (whose number average molecular weight Mn=10,000, whose average number of functional groups f=3, and whose OH number=18)

Polyoxyalkylene Polyol (A4)

Excenol 1020 produced by Asahi Glass Co., Ltd. (whose number average molecular weight Mn=1,000, whose average number of functional groups f=2, and whose OH number=112)

Hydroxy Group-Containing Compound (E1) Having Siloxane Skeleton and Oxyalkylene Ether Skeleton A silicone oil whose main chain has an oxyalkylene ether skeleton having a hydroxyl group bonded thereto, and a siloxane skeleton having the oxyalkylene ether skeletons bonded to both side thereof (whose content of the siloxane skeleton is 63%, whose average number of functional groups f=2, whose OH number=61, and whose constituent unit of the siloxane skeleton is —Si(CH$_3$)$_2$—O—).

Hydroxy Group-Containing Compound (F1) Having Siloxane Skeleton

KF6001 produced by Shinetsu Silicone Co., Ltd., a silicone oil whose siloxane skeleton of the main chain has hydroxyl groups bonded to both sides thereof (whose content of the siloxane skeleton is 94%, whose average number of functional groups f=2, whose OH number=62, and whose constituent unit of the siloxane skeleton is Si(CH$_3$)$_2$—O—).

Mixture of Polyoxyalkylene Polyols (A2) and (A4)

A mixture whose blending ratios of (A2) and (A4) are adjusted such that the hydroxyl group number thereof is 61.

Mixture of Polyoxyalkylene Polyols (A2) and (A4), and Hydroxyl Group-Containing Compound (E2) Having Siloxane Skeleton and Oxyalkylene Ether Skeleton A mixture whose blending amounts of the components thereof are adjusted such that the content of the siloxane skeleton is 8.5%.
(E2); SF8427 produced by Dow Corning Toray Co., Ltd., a silicone oil whose main chain has an oxyalkylene ether skeleton having a hydroxyl group bonded thereto and a siloxane skeleton having the oxyalkylene ether skeletons bonded to both sides thereto (whose average number of functional groups f=2, whose OH number=61, and whose constituent unit of the siloxane skeleton is —Si(CH$_3$)$_2$—O—).

Isocyanate 1

Trimethylhexamethylenediisocyanate (TMDI)

Isocyanate 2

Isophoronediisocyanate (IPDI)

Hydroxyl Group-Containing Compound (E2) Having Siloxane Skeleton, Chain Elongating Agent A compound whose blending amount of the chain elongating agent is adjusted such that the content of the siloxane skeleton is 8.5%.
Chain Elongating Agent; A mixture of D2000 produced by HUNTSMAN (a diamine whose polypropylene ether skeleton has amino groups bonded to both sides thereof) and D400 produced by HUNTSMAN (a diamine whose polypropylene ether skeleton has amino groups bonded to both sides thereof) that are adjusted such that the amine equivalent weight is 920.

The pre-polymers 1, 3, 5, 7, and 9 obtained in Production Examples each contained the isocyanate group-containing urethane pre-polymer (II) that had a siloxane skeleton and an oxyalkylene ether skeleton. The pre-polymer 6 obtained in Production Example 6 contained the chain-elongated urethane pre-polymer (b) that was formed by chain-elongating the urethane pre-polymer (II) by the chain elongating agent.

Examples 1 to 8 and Comparative Examples 1 to 3

The pre-polymers obtained in Production Examples 1 to 9, the latent curing agent, and the additives were mixed with each other by a planetary mixer at the composition and the ratios (parts by mass) shown in Table 3 to obtain curable compositions. Each of the obtained curable compositions was foamed with a gas to be applied to form a bead having a width of 8 mm and a length of 300 mm using a mechanical foaming apparatus FP-ST manufactured by Sunstar Engineering Co., Ltd., and, immediately after the application, the bead was cured in a heat circulating oven at 80° C. for 10 minutes to produce a polyurethane foam. The foaming structure of each of the polyurethane foams in Examples 1 to 8 was closed-cell foaming. For each of the polyurethane foams of Examples 1 to 8 and Comparative Examples 1 to 3, the expansion ratio, the cell diameter, the cell uniformity, and the sealing property were measured and the result thereof was shown in Table 3. In Table 3, siloxane skeleton/overall NCO-containing compound (% by mass) presents the content (% by mass) of the siloxane skeleton in the isocyanate group-containing urethane pre-polymer (II) or the chain-elongated urethane pre-polymer (b) included in the curable composition, relative to 100% by mass of the total amount of the overall NCO group-containing compound contained in the curable composition. Siloxane skeleton/curable composition (% by mass) presents the content of the overall dimethylsiloxane skeleton contained in the curable composition, relative to the 100% by mass of the curable composition.

The foaming conditions of the mechanical foaming apparatus FP-ST were as follows.
Discharging Gun (Nozzle) . . . N5A type (whose nozzle diameter was 0.8 mm).
Material Pressure . . . 7 to 14 MPa
Discharging Pressure . . . 4 to 12 MPa
Gas Introduction Pressure . . . 0.12 to 0.17 MPa
Gas Mixing Amount . . . Corresponding to 3 to 4-fold foaming volume (described in Table 3)
Material Discharging Flow: 50 cc/min
Environmental Temperature: 15 to 25° C.

TABLE 3

|  | Example | | | | | | | | Comparative Example | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Pre-Polymer 1 | 39.4 | — | — | — | — | — | — | — | — | — | — |
| Pre-Polymer 2 | — | 39.2 | — | — | — | — | — | 39.2 | 39.4 | — | 39 |
| Pre-Polymer 3 | — | 0.2 | — | — | — | — | — | — | — | — | — |
| Pre-Polymer 4 | — | — | 48.9 | 45.2 | 48.8 | 48.9 | 48.9 | — | — | 49.2 | — |
| Pre-Polymer 5 | — | — | 0.3 | 4.0 | — | — | — | — | — | — | — |
| Pre-Polymer 6 | — | — | — | — | 0.4 | — | — | — | — | — | — |
| Pre-Polymer 7 | — | — | — | — | — | 0.3 | 0.3 | — | — | — | — |
| Pre-Polymer 8 | — | — | — | — | — | — | — | — | — | — | 0.4 |
| Pre-Polymer 9 | — | — | — | — | — | — | — | 0.2 | — | — | — |
| Isocyanate 3 | — | — | 0.4 | 0.4 | 0.4 | 0.4 | 0.4 | — | — | 0.4 | — |
| Filler 1 | 4 | 4 | — | — | — | — | — | 4 | 4 | — | 4 |
| Filler 2 | 6 | 6 | 5 | 5 | 5 | 5 | 5 | 6 | 6 | 5 | 6 |
| Filler 3 | 13.6 | 13.6 | 11.1 | 11.1 | 11.1 | 11.1 | 11.1 | 13.6 | 13.6 | 11.1 | 13.6 |

TABLE 3-continued

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Filler 4 | 1 | 1 | 0.7 | 0.7 | 0.7 | 0.7 | 0.7 | 1 | 1 | 0.7 | 1 |
| Curing Agent | 3.0 | 3.0 | 2.6 | 2.6 | 2.6 | 2.6 | 2.6 | 3.0 | 3.0 | 2.6 | 3.0 |
| Plasticizer A | | 33 | 17 | 31 | 17 | 31 | | 33 | 33 | 17 | 33 |
| Plasticizer B | 33 | | | | | | 31 | | | | |
| Plasticizer C | | | 14 | | 14 | | | | | 14 | |
| Total | 100 | 100 | 100 | 100 | 100 | 100 | 100 | 100 | 100 | 100 | 100 |
| Expansion Ratio | 3.3 | 3.1 | 4.0 | 4.0 | 3.0 | 4.0 | 4.0 | 3.0 | 3.0 | 3.0 | 3.0 |
| Siloxane Skeleton/Overall NCO-Containing Compound (% by Mass) | 0.38 | 0.26 | 0.22 | 2.92 | 0.06 | 0.22 | 0.22 | 0.13 | 0 | 0 | 0.77 |
| Dimethylsiloxane Skeleton/Curable Composition (% by Mass) | 0.15 | 0.10 | 0.11 | 1.40 | 0.03 | 0.11 | 0.11 | 0.05 | 0 | 0 | 0.30 |
| Sealing Property | ○ | ○ | ○ | ○ | ○ | ○ | ○ | ○ | X | X | X |
| Cell Diameter | ○ | ○ | ○ | ○ | ○ | ○ | ○ | ○ | X | X | X |
| Uniformity of Cells | ○ | ○ | ○ | ○ | ○ | ○ | ○ | ○ | X | X | X |

Isocyanate 3

Crude MDI (whose commercial product name is "Sumidur 44V-20" produced by Sumitomo Bayer Japan Co., Ltd.

Filler 1

TS720 (hydrophobic silica) produced by Cabot Specialty Chemicals Co., Ltd.

Filler 2

CCR-B (surface-treated calcium carbonate) produced by Shiraishi Calcium Co., Ltd.

Filler 3

Whiton SB (heavy calcium carbonate) produced by Shiraishi Calcium Co., Ltd.

Filler 4

HI-BLACK 20 (carbon black) produced by Korea Carbon Black Co., Ltd.

Curing Agent

A fine particles-coated amine whose surface of a solid amine having the central particle diameter of 13 μm (1,12-dodecanediamine having a melting point of 71° C.) is coated with fine particles (titanium oxide fine particles) having the central particle diameter of 0.02 μm. The second absorption peak heat amount thereof was 150 J/g.

Plasticizer A

DINP (DINP, diisononyl phthalate) produced by New Japan Chemical Co., Ltd.,

Plasticizer B

Mesamoll (alkyl sulphonic acid phenyl-based ester) produced by LANXESS

Plasticizer C

Adekacizer C-8 (trimellitic acid octyl ester) produced by ADEKA

The curable compositions of Examples 1 to 3 and 5 to 8 each contained the pre-polymer 1, 3, 5, 7, or 9 and therefore contained the urethane pre-polymer (II). The curable composition of Example 4 contained the pre-polymer 6 and therefore contained the urethane pre-polymer (b) formed by chain-elongating the urethane pre-polymer (II).

As presented by Examples 1 to 8, the polyurethane foams each produced using the curable composition containing the urethane pre-polymer (II) or the urethane pre-polymer (b) formed by chain-elongating the urethane pre-polymer (II) were excellent in the cell uniformity and each had an excellent sealing property.

EXPLANATIONS OF LETTERS OR NUMBERS

1 . . . apparatus to mix a gas into a curable composition, 10 . . . piston pump, 15 . . . driving part, 20 . . . intake valve (needle valve), 30 . . . discharge valve (needle valve), 40 . . . tank, 41 . . . pressure-feeding pump, 43 . . . air intake port, 46 . . . nozzle, 47 . . . pipe path

The invention claimed is:
1. A polyurethane foam produced from a curable composition comprising:
an isocyanate group-containing urethane pre-polymer (I) that has an oxyalkylene ether skeleton and no siloxane skeleton; and
an isocyanate group-containing urethane pre-polymer (II) that has a siloxane skeleton and an oxyalkylene ether skeleton, wherein
the siloxane skeleton is represented by the following formula (1);

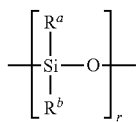

and wherein
$R^a$ and $R^b$ each independently represent a monovalent substituent group and r represents an integer equal to or larger than 1, 12. The polyurethane foam according to claim 11, wherein the plasticizer is an alkyl sulfonic acid phenyl-based ester (Mesamoll).

13. A polyurethane foam produced from a curable composition comprising:
  an isocyanate group-containing urethane pre-polymer (I) that has an oxyalkylene ether skeleton and no siloxane skeleton; and
  an isocyanate group-containing urethane pre-polymer (II) that has a siloxane skeleton and an oxyalkylene ether skeleton, represented by the following formula (2),

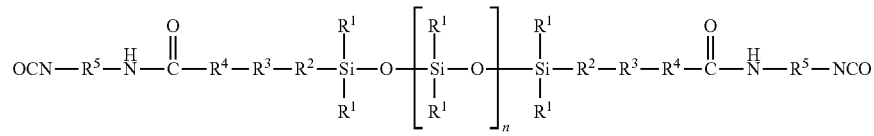

wherein the foam is a closed-cell foam, and the cells have a mode average diameter <150 μm.

2. The polyurethane foam according to claim 1, wherein
the urethane pre-polymer (II) has the oxyalkylene ether skeleton having the isocyanate group bonded thereto, and
the siloxane skeleton having the oxyalkylene ether skeletons bonded to both sides thereof.

3. The polyurethane foam according to claim 1 wherein the urethane pre-polymer (II) has the siloxane skeleton and the oxyalkylene ether skeleton bonded to each other through an alkylene skeleton, and/or a urethane bond or a urea bond.

4. The polyurethane foam of claim 1 wherein five or fewer cells per 4 mm$^2$ have a cell diameter ≥250 μm.

5. The polyurethane foam according to claim 1, wherein the foam has water sealing properties.

6. The polyurethane foam according to claim 1, wherein the number of the repeating units of siloxane constituting the siloxane skeleton in the urethane pre-polymer (II) is 1 to 100.

7. The polyurethane foam according to claim 1, wherein at least a portion of the urethane pre-polymer (I) and/or the urethane pre-polymer (II) is chain-elongated.

8. The polyurethane foam according to claim 1, further comprising a latent curing agent.

9. The polyurethane foam according to claim 8, wherein the latent curing agent is a fine particles-coated amine whose surface of a solid amine is coated with fine particles.

10. The polyurethane foam according to claim 9, wherein the fine particles-coated amine has the surface of the solid amine that has a melting point equal to or higher than 50° C. and a central particle diameter equal to or smaller than 20 μm, coated with the fine particles having a central particle diameter equal to or smaller than 2 μm, and has a heat amount equal to or smaller than 220 J/g at a second absorption peak measured using a differential scanning calorimeter.

11. The polyurethane foam according to claim 1, further comprising a plasticizer and a filler.

wherein each $R^1$ is independently a monovalent hydrocarbon group, each $R^2$ is independently a straight-chain or a branched-chain alkylene group having 1 to 6 carbon atoms, each $R^3$ is independently an oxyalkylene group represented by a formula $-[R^6-O]_m-$, wherein $R^6$ represents a straight-chain or a branched-chain alkylene group having 1 to 6 carbon atoms and m represents an integer of 1 to 55, $R^4$ represents $-O-$ or $-NH-$, $R^5$ represents a divalent aliphatic hydrocarbon group, a divalent alicyclic hydrocarbon group, or a divalent aromatic hydrocarbon group, and n represents an integer of 1 to 100, wherein the urethane pre-polymer (I) has 0.5 to 10% by mass of the NCO content measured according to JISK0113 using a potentiometric titration method, and the urethane pre-polymer (II) has 0.5 to 10% by mass of the NCO content measured according to JISK0113 using a potentiometric titration method, and wherein the content of the siloxane skeleton in the urethane pre-polymer (II) is 0.001 to 0.5% by mass relative to 100% by mass of the total amount of an overall NCO group-containing compound contained in the curable composition, wherein the foam is a closed cell foam, and wherein
  the cells have a mode average diameter <150 μm, or
  five or fewer cells per 4 mm$^2$ have a cell diameter ≥250 μm.

14. A polyurethane foam produced from a curable composition comprising:
  an isocyanate group-containing urethane pre-polymer (I) that has an oxyalkylene ether skeleton and no siloxane skeleton; and
  an isocyanate group-containing urethane pre-polymer (II) that has a siloxane skeleton and an oxyalkylene ether skeleton, represented by the following formula (2),

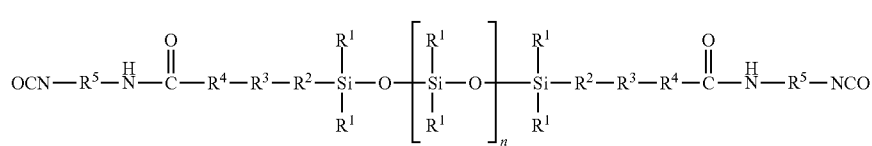

(2)

wherein each $R^1$ is independently a monovalent hydrocarbon group, each $R^2$ is independently a straight-chain or a branched-chain alkylene group having 1 to 6 carbon atoms, each $R^3$ is independently an oxyalkylene group represented by a formula $-[R^6-O]_m-$, wherein $R^6$ represents a straight-chain or a branched-chain alkylene group having 1 to 6 carbon atoms and m represents an integer of 1 to 55, $R^4$ represents $-O-$ or $-NH-$, $R^5$ represents a divalent aliphatic hydrocarbon group, a divalent alicyclic hydrocarbon group, or a divalent aromatic hydrocarbon group, and n represents an integer of 1 to 100, wherein the urethane pre-polymer (I) has 0.5 to 10% by mass of the NCO content measured according to JISK0113 using a potentiometric titration method, and the urethane pre-polymer (II) has 0.5 to 10% by mass of the NCO content measured according to JISK0113 using a potentiometric titration method, and wherein the content of the siloxane skeleton in the urethane pre-polymer (II) is 0.001 to 0.5% by mass relative to 100% by mass of the total amount of an overall NCO group-containing compound contained in the curable composition, wherein
the foam is flexible, or
the curable composition has a volume and the polyurethane foam has a volume, expansion ratio of the polyurethane foam volume to curable composition volume ranges from 3:1 to 4:1.

15. A closed-cell polyurethane foam produced from mixing components consisting of:
a gas selected from the group consisting of air, carbon dioxide, nitrogen, oxygen, argon, and krypton,
a filler,
a curing agent,
a plasticizer, and
a curable composition comprising:
an isocyanate group-containing urethane pre-polymer (I) that has an oxyalkylene ether skeleton and no siloxane skeleton; and
an isocyanate group-containing urethane pre-polymer (II) that has a siloxane skeleton and an oxyalkylene ether skeleton, represented by the following formula (2),

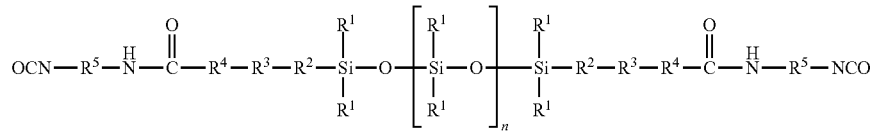

(2)

wherein each $R^1$ is a methyl group, each $R^2$ is independently a propylene group, each $R^3$ is independently an oxyalkylene group represented by a formula $-[R^6-O]_m-$, wherein $R^6$ represents an ethylene group or a propylene group and m represents an integer of 1 to 55, $R^4$ represents $-O-$ or $-NH-$, $R^5$ represents a divalent aliphatic hydrocarbon group, a divalent alicyclic hydrocarbon group, or a divalent aromatic hydrocarbon group, and n represents an integer of 1 to 100;

wherein the closed cell foam cells have a mode average diameter of <150 μm;

wherein five or fewer cells per 4 mm² have a cell size ≥250 μm;

wherein the foam is free of hydrofluorocarbons (HFCs) and/or chlorofluorocarbons (CFCs); and wherein the foam has water sealing properties.

* * * * *